US011870156B2

(12) United States Patent
Eshrah et al.

(10) Patent No.: US 11,870,156 B2

(45) Date of Patent: Jan. 9, 2024

(54) PRINTED PHASED ARRAY ANTENNAS WITH EXTENDED SCAN RANGE

(71) Applicant: Analog Devices International Unlimited Company, Limerick (IE)

(72) Inventors: Islam A. Eshrah, Giza (EG); Mohamed Alaaeldin Moharram Hassan, Al Jizah (EG); Omar El Sayed Wadah, Giza (EG)

(73) Assignee: Analog Devices International Unlimited Company, Limerick (IE)

( * ) Notice: Subject to any disclaimer, the term of this patent is extended or adjusted under 35 U.S.C. 154(b) by 84 days.

(21) Appl. No.: 17/519,864

(22) Filed: Nov. 5, 2021

(65) Prior Publication Data

US 2022/0166138 A1 May 26, 2022

Related U.S. Application Data

(60) Provisional application No. 63/118,690, filed on Nov. 26, 2020.

(51) Int. Cl.
*H01Q 3/30* (2006.01)
*H01Q 9/04* (2006.01)

(52) U.S. Cl.
CPC ............. *H01Q 3/30* (2013.01); *H01Q 9/0414* (2013.01)

(58) Field of Classification Search
CPC ...... H01Q 3/30; H01Q 9/0414; H01Q 1/2283; H01Q 1/38; H01Q 1/523; H01Q 3/26
See application file for complete search history.

(56) References Cited

U.S. PATENT DOCUMENTS

| | | | | |
|---|---|---|---|---|
| 10,374,274 B2 | 8/2019 | Adas et al. | | |
| 2019/0334220 A1* | 10/2019 | Ali | ......................... | H01Q 1/526 |
| 2021/0066782 A1* | 3/2021 | Cho | ......................... | H01Q 1/243 |

OTHER PUBLICATIONS

Almanama, *Design of Micromachined Patch Antenna with Performance Enhancement for Millimeter Wave Applications*, The Islamic University of Gaza, Deanery of Post Graduate Studies Facility of Engineering, Nov. 2013, 89 pages.

(Continued)

*Primary Examiner* — Dieu Hien T Duong

(74) *Attorney, Agent, or Firm* — Knobbe, Martens, Olson & Bear, LLP

(57) ABSTRACT

Different approaches that aim to extend scan range of phased array antennas by means of altering surface waves and/or altering the coupling are disclosed. One approach includes providing a phased array antenna where a surface of a substrate that houses antenna elements of the array includes openings such as trenches or grooves. Such openings in the surface effectively reduce the dielectric constant of the substrate, are easy to manufacture, and may reduce or eliminate the need to use exotic and expensive low-k dielectric materials. Another approach includes providing a phased array antenna where antenna elements are disposed over a substrate in the form of surface mount (SMT) components that are reduced in size/footprint. Using SMT antenna elements with a reduced size allows achieving the same gain while spacing antenna elements farther apart with gaps in between the antenna elements, thus also reducing the overall dielectric constant of the substrate.

20 Claims, 11 Drawing Sheets

(56) References Cited

OTHER PUBLICATIONS

Sathanur et al., *A Two-Element Micromachined Microstrip Antenna Array with Improved Performance*, Microwave Laboratory, Department of Electrical Communication Engineering, Indian Institute of Science, Bangalore, India, 4 pages.
Pu et al., *Broadband Surface Wave Attenuation in Periodic Trench Barriers*, Journal of Sound and Vibration 468 (2020), 14 pages.
Pozar et al., *Scan Blindness in Infinite Phased Arrays of Printed Dipoles*, IEEE Transactions on Antennas and Propagation, vol. AP-32, No. 6, Jun. 1984, 9 pages.
Nikolić et al., *Microstrip Antennas with Suppressed Radiation in Horizontal Directions and Reduced Coupling*, IEEE Transactions on Antennas and Propagation, vol. 53, No. 11, Nov. 2005, 8 pages.
Avser et al., *A New Method for the Prognosis of Scan Blindness Angle in Finite Phased Arrays of Printed Dipoles*, Proceedings of the 5$^{th}$ European Conference on Antennas and Propagation (EUCAP), 4 pages.
Komanduri et al., *A General Method for Designing Reduced Surface Wave Microstrip Antennas*, IEEE Transactions on Antennas and Propagation, vol. 61, No. 6, Jun. 2013, 8 pages.
Dancila et al., *Wide Band On-Chip Slot Antenna with Back-Side Etched Trench for W-Band Sensing Applications*, 2013 7$^{th}$ European Conference on Antennas and Propagation (EuCAP), 4 pages.
Ahmad et al., *A Compact Efficient D-Band Micromachined On-Chip Differential Patch Antenna for Radar Applications*, 201 2019 IEEE, 2 pages.

* cited by examiner

PRINTED PHASED ARRAY ANTENNAS WITH EXTENDED SCAN RANGE

CROSS REFERENCE TO RELATED APPLICATIONS

This application is related to U.S. Patent Application No. 63/118,690, filed Nov. 26, 2020, titled "PRINTED PHASED ARRAY ANTENNAS WITH EXTENDED SCAN RANGE," the disclosure of which is hereby incorporated by reference herein in its entirety.

TECHNICAL FIELD OF THE DISCLOSURE

The present disclosure generally relates to phased array antennas of radio frequency (RF) systems.

BACKGROUND

Radio systems are systems that transmit and receive signals in the form of electromagnetic waves in the RF range of approximately 3 kilohertz (kHz) to 300 gigahertz (GHz). Radio systems are commonly used for radar, microwave imaging, wireless communications, etc., with cellular/wireless mobile technology being a prominent example.

In context of radio systems, an antenna is a device that serves as the interface between radio waves propagating wirelessly through space and electric currents moving in metal conductors used with a transmitter or receiver. During transmission, a radio transmitter supplies an electric current to the antenna's terminals, and the antenna radiates the energy from the current as radio waves. During reception, an antenna intercepts some of the power of a radio wave in order to produce an electric current at its terminals, which current is subsequently applied to a receiver to be amplified. Antennas are essential components of all radio equipment, and are used in radio broadcasting, broadcast television, two-way radio, communications receivers, radar, cell phones, satellite communications and other devices.

An antenna with an ideal single antenna element will typically broadcast a radiation pattern that radiates equally in all directions in a spherical wavefront. Phased array antennas generally refer to a collection of antenna elements that are used to focus electromagnetic energy in a particular direction, thereby creating a main beam. Phased array antennas offer numerous advantages over single antenna systems, such as high gain, ability to perform directional steering, and simultaneous communication. Therefore, phased array antennas are being used more frequently in a myriad of different applications, such as mobile technology, cellular telephone and data, Wi-Fi technology, automotive and industrial airplane radar, and military applications.

A scan range of a phased array antenna may be limited by the presence of grating lobes, which are radiation pattern aliases in the physical domain and are often unavoidable. Printed antenna arrays can also be limited by the coupling to surface waves within grounded dielectric. These phenomena may cause radiation pattern deformation and high return loss in certain sets of beam scanning angles. Reducing or eliminating the presence of the surface waves in the required scan range is the best option to mitigate these detrimental effects, which limit the potential of the phased array to perform in a wide frequency band and wide scan range.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
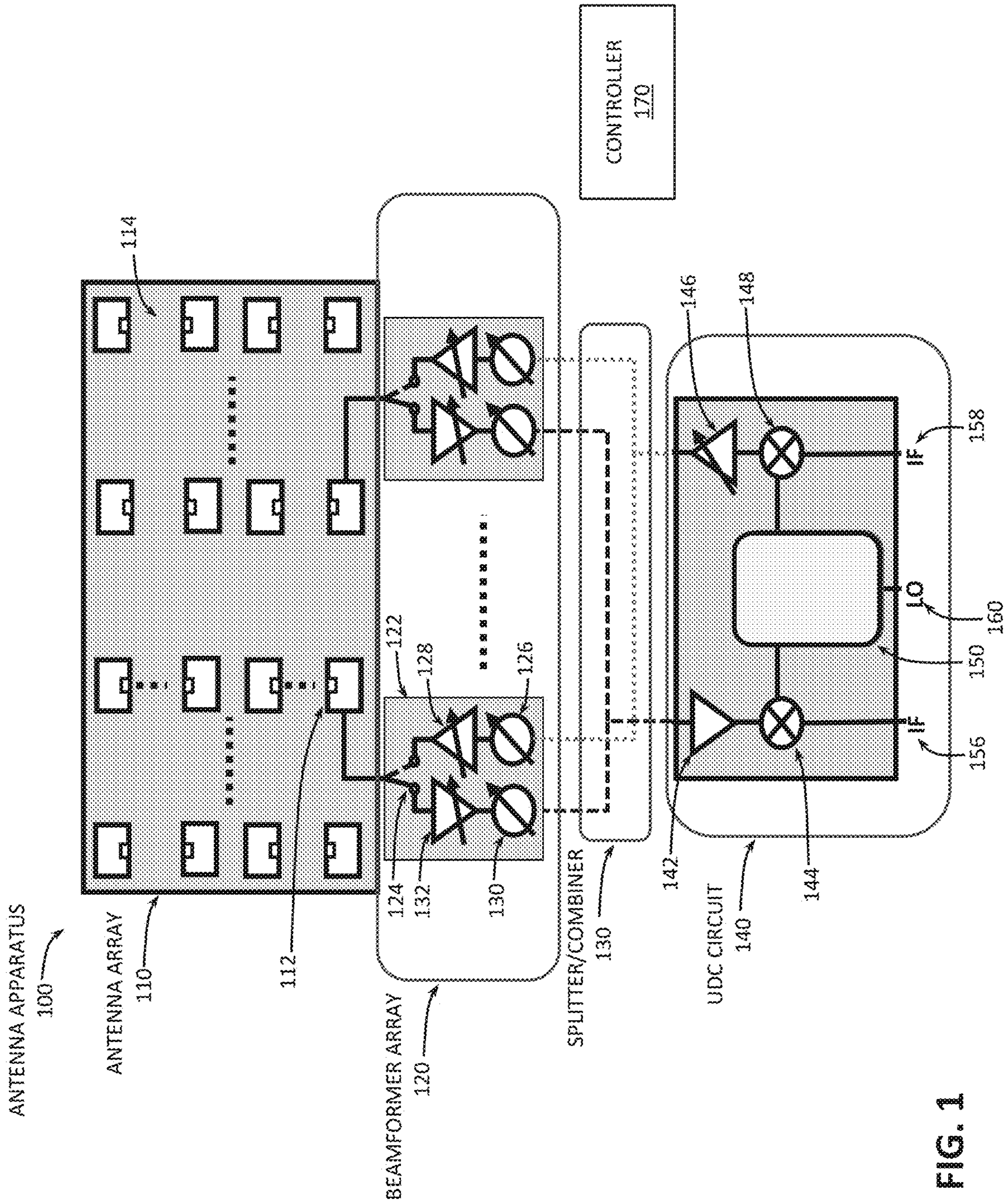
FIG. 1 provides a schematic illustration of an example antenna apparatus in which a phased array antenna with extended scan range may be implemented, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating phased array antennas with extended scan range, proposed herein, it might be useful to first understand phenomena that may come into play in RF systems employing phased array antennas. The following foundational information may be viewed as a basis from which the present disclosure may be properly explained. Such information is offered for purposes of explanation only and, accordingly, should not be construed in any way to limit the broad scope of the present disclosure and its potential applications.

As described above, phased array antennas generally refer to a collection of antenna elements that are used to focus RF energy on a particular direction, thereby creating a main beam. In particular, the individual antenna elements of a phased array antenna may radiate in a spherical pattern, but, collectively, a plurality of such antenna elements may be configured to generate a wavefront in a particular direction through constructive and destructive interference. The relative phases of the signal transmitted at each antenna element can be either fixed or adjusted, allowing the antenna system to steer the wavefront in different directions. A phased array antenna typically includes an oscillator, a plurality of antenna elements, a phase adjuster or shifter, a variable gain amplifier, a receiver, and a control processor. A phased array antenna system uses phase adjusters or shifters to control the phase of the signal transmitted by an antenna element. The radiated patterns of the antenna elements constructively interfere in a target direction creating a wavefront in that direction called the main beam. The phased array can realize increased gain and improve signal to interference plus noise ratio in the direction of the main beam. The radiation patterns may interfere destructively in directions other than the direction of the main beam, reducing gain in those directions.

The term "surface-wave excitation" refers to formation of electromagnetic waves that propagate as "surface waves" in that they are guided along an interface between two media having different dielectric constants. In context of phased array antennas, surface waves can be created in certain conditions, e.g., for certain beam angles (i.e., for certain directions of the main beam), and be guided along the surface of a support structure (e.g., a printed circuit board (PCB) or a substrate) with a phased array antenna.

Surface-wave excitation is not a desirable phenomenon for phased array antennas because it causes loss in power in the direction of the main beam and may cause scan blindness. One conventional approach to reducing surface-wave excitation includes using materials with lower dielectric constants (commonly referred to as "low-k dielectrics"). However, such materials are typically exotic and expensive. Another conventional approach includes using thin substrates. However, this approach has a disadvantage of reducing the matching bandwidth (i.e., impedance matching cannot be achieved for large bandwidths). Yet another conventional approach includes using closely packed antenna elements. However, this approach has disadvantages of a reduced gain due to smaller overall aperture of an antenna array and an increased coupling between the antenna elements.

Embodiments of the present disclosure set forth different approaches to providing phased array antennas, e.g., printed phased array antennas, that may improve on one or more disadvantages described above. The approaches presented herein aim to extend scan range of phased array antennas by means of altering surface waves and/or altering the coupling. One approach includes providing a phased array antenna where a surface of a substrate (e.g., a PCB) that houses antenna elements of the array includes openings such as trenches or grooves. Such openings in the surface effectively reduce the dielectric constant of the substrate, are easy to manufacture, and may reduce or eliminate the need to use exotic and expensive low-k dielectric materials. Another approach includes providing a phased array antenna where antenna elements are disposed over a substrate in the form of SMT components that are reduced in size/footprint. Using SMT antenna elements with a reduced size allows achieving the same gain (by using the same total number of antenna elements) while spacing antenna elements farther apart with gaps in between the antenna elements, thus also reducing the overall dielectric constant of the substrate. In some embodiments, the gaps between the antenna elements may be used to advantageously house other SMT components of the phased array antenna, such as capacitors or resistors. Furthermore, in some embodiments, phased array antennas may implement a combination of both approaches.

Approaches to providing phased array antennas with extended scan range disclosed herein may advantageously move the blind-scan angle of a phased array antenna toward the edge of the visible-range in manners that are relatively easy and inexpensive to implement without substantially compromising other performance parameters. While not limited to, phased array antennas with extended scan range, disclosed herein, may be particularly beneficial for use in fifth generation (5G) communications, e.g., in millimeter-wave (mm-wave) or sub-6 GHz, applications.

The following detailed description presents various descriptions of specific certain embodiments. However, the innovations described herein can be embodied in a multitude of different ways, for example, as defined and covered by some examples presented herein. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Sometimes, in the present descriptions, the term "circuit" may be omitted (e.g., an up-and-down converter (UDC) circuit 140 shown in the present drawings may be referred to in the present descriptions as a "UDC 140," etc.). If used, the terms "substantially," "approximately," "about," etc., may be used to generally refer to being within +/−20% of a target value, e.g., within +/−10% of a target value, based on the context of a particular value as described herein or as known in the art.

Example Antenna Apparatus

FIG. 1 provides a schematic illustration of an example antenna apparatus 100 in which a phased array antenna with extended scan range may be implemented, according to some embodiments of the present disclosure. As shown in FIG. 1, the system 100 may include an antenna array 110, a beamformer array 120, a UDC circuit 140, and a controller 170.

In general, the antenna array 110 may include a plurality of antenna elements 112 (only one of which is labeled with a reference numeral in FIG. 1 in order to not clutter the drawing), housed in (e.g., in or over) a substrate 114, where the substrate 114 may be, e.g., a PCB or any other support structure. In various embodiments, the antenna elements 112 may be radiating elements or passive elements. For example, the antenna elements 112 may include dipoles, open-ended waveguides, slotted waveguides, microstrip antennas, and the like. In some embodiments, the antenna elements 112 may include any suitable elements configured to wirelessly transmit and/or receive RF signals. The antenna array 110 may be a phased array antenna and, therefore, will be referred to as such in the following. In some embodiments, the phased array antenna 110 may be a printed phased array antenna.

Various embodiments of the present disclosure relate to various configurations that aim to extend scan range of the phased array antenna 110 by means of altering surface waves and/or altering the coupling. Further details shown in FIG. 1, such as the particular arrangement of the beamformer array 120, of the UDC circuit 140, and the relation between the beamformer array 120 and the UDC circuit 140 may be different in different embodiments, with the description of FIG. 1 providing only some examples of how these components may be used together with the phased array antenna 110 being configured as a phased array antenna with extended scan range. Furthermore, although some embodiments shown in the present drawings illustrate a certain number of components (e.g., a certain number of antenna elements 112, beamformers, and/or UDC circuits), it is appreciated that these embodiments may be implemented with any number of these components in accordance with the descriptions provided herein. Furthermore, although the disclosure may discuss certain embodiments with reference to certain types of components of an antenna apparatus (e.g., referring to a substrate that houses antenna element as a PCB although in general it may be any suitable support structure), it is understood that the embodiments disclosed herein may be implemented with different types of components.

The beamformer array 120 may include a plurality of, beamformers 122 (only one of which is labeled with a reference numeral in FIG. 1 in order to not clutter the drawing). The beamformers 122 may be seen as transceivers (e.g., devices which may transmit and/or receive signals, in this case—RF signals) that feed to antenna elements 112. In some embodiments, a single beamformer 122 may be associated with one of the antenna elements 112 (e.g., in a one-to-one correspondence). In other embodiments, two beamformers 122 may be associated with a single antenna element 112, e.g., if the antenna elements 112 are dual-polarization antenna elements. In still other embodiments, a single beamformer 122 may be associated with two or more of the antenna elements 112 (i.e., such a beamformer 122 may be a multi-channel beamformer).

In some embodiments, each of the beamformers 122 may include a switch 124 to switch the path from the corresponding antenna element 112 to the receiver or the transmitter path. Although not specifically shown in FIG. 1, in some embodiments, each of the beamformers 122 may also include another switch to switch the path from a signal processor (also not shown) to the receiver or the transmitter path. As shown in FIG. 1, in some embodiments, the transmit path (TX path) of each of the beamformers 122 may include a phase shifter 126 and a variable (e.g., programmable) gain amplifier 128, while the receive path (RX path) may include a phase adjusted 130 and a variable (e.g., programmable) gain amplifier 132. The phase shifter 126 may be configured to adjust the phase of the RF signal to be transmitted (TX signal) by the antenna element 112 and the variable gain amplifier 128 may be configured to adjust the amplitude of the TX signal to be transmitted by the antenna element 112. Similarly, the phase shifter 130 and the variable gain amplifier 132 may be configured to adjust the RF signal received (RX signal) by the antenna element 112 before providing the RX signal to further circuitry, e.g., to the UDC circuit 140, to the signal processor (not shown), etc. The beamformers 122 may be considered to be “in the RF path” of the antenna apparatus 100 because the signals traversing the beamformers 122 are RF signals (i.e., TX signals which may traverse the beamformers 122 are RF signals upconverted by the UDC circuit 140 from lower frequency signals, e.g., from intermediate frequency (IF) signals or from baseband signals, while RX signals which may traverse the beamformers 122 are RF signals which have not yet been downconverted by the UDC circuit 140 to lower frequency signals, e.g., to IF signals or to baseband signals).

Although a switch is shown in FIG. 1 to switch from the transmitter path to the receive path (i.e., the switch 124), in other embodiments of the beamformer 122, other components can be used, such as a duplexer. Furthermore, although FIG. 1 illustrates an embodiment where the beamformers 122 include the phase shifters 126, 130 (which may also be referred to as “phase adjusters”) and the variable gain amplifiers 128, 132, in other embodiments, any of the beamformers 122 may include other components to adjust the magnitude and/or the phase of the TX and/or RX signals. In some embodiments, one or more of the beamformers 122 may not include the phase shifter 126 and/or the phase shifter 130 because the desired phase adjustment may, alternatively, be performed using a phase shift module in the local oscillator (LO) path. In other embodiments, phase adjustment performed in the LO path may be combined with phase adjustment performed in the RF path using the phase shifters of the beamformers 122.

Turning to the details of the UDC, in general, the UDC circuit 140 may include an upconverter and/or downconverter circuitry, i.e., in various embodiments, the UDC circuit 140 may include 1) an upconverter circuit but no downconverter circuit, 2) a downconverter circuit but no upconverter circuit, or 3) both an upconverter circuit and a downconverter circuit. As shown in FIG. 1, in some embodiments, the downconverter circuit of the UDC circuit 140 may include an amplifier 142 and a mixer 144, while the upconverter circuit of the UDC circuit 140 may include an amplifier 146 and a mixer 148. In some embodiments, the UDC circuit 140 may further include a phase shift module 150.

In various embodiments, the term “UDC circuit” may be used to include frequency conversion circuitry (e.g., a frequency mixer configured to perform upconversion to RF signals for wireless transmission, a frequency mixer configured to perform downconversion of received RF signals, or both), as well as any other components that may be included in a broader meaning of this term, such as filters, analog-to-digital converters (ADCs), digital-to-analog converters (DACs), transformers, and other circuit elements typically used in association with frequency mixers. In all of these variations, the term "UDC circuit" covers implementations where the UDC circuit 140 only includes circuit elements related to the TX path (e.g., only an upconversion mixer but not a downconversion mixer; in such implementations the UDC circuit may be used as/in an RF transmitter for generating RF signals for transmission, e.g., the UDC circuit 140 may enable a calibration probe (also referred to simply as "probe") or an antenna element of the phased array antenna 110 that is connected to the UDC circuit 140 to act, or be used, as a transmitter), implementations where the UDC circuit 140 only includes circuit elements related to the RX path (e.g., only an downconversion mixer but not an upconversion mixer; in such implementations the UDC circuit 140 may be used as/in an RF receiver to downconvert received RF signals, e.g., the UDC circuit 140 may enable an antenna element of the phased array antenna 110 to act, or be used, as a receiver), as well as implementations where the UDC circuit 140 includes, both, circuit elements of the TX path and circuit elements of the RX path (e.g., both the upconversion mixer and the downconversion mixer; in such implementations the UDC circuit 140 may be used as/in an RF transceiver, e.g., the UDC circuit 140 may enable an antenna element of the phased array antenna 110 to act, or be used, as a transceiver).

Although a single UDC circuit 140 is illustrated in FIG. 1, multiple UDC circuits 140 may be included in the antenna apparatus 100 to provide upconverted RF signals to and/or receive RF signals to be downconverted from any one of the beamformers 122. Each UDC circuit 140 may be associated with a plurality of beamformers 122 of the beamformer array 120, e.g., using a splitter/combiner 130. This is schematically illustrated in FIG. 1 with dashed lines and dotted lines within the splitter/combiner 130 connecting various elements of the beamformer array 120 and the UDC circuit 140. Namely, FIG. 1 illustrates that the dashed lines connect the downconverter circuit of the UDC circuit 140 (namely, the amplifier 142) to the RX paths of two different beamformers 122, and that the dotted lines connect the upconverter circuit of the UDC circuit 140 (namely, the amplifier 146) to the TX paths of two different beamformers 122. For example, there may be 96 beamformers 122 in the beamformer array 120, associated with 96 single-polarized antenna elements 112 (or, alternatively, 48 dual-polarized antenna elements 112) of the phased array antenna 110.

In some embodiments, the mixer 144 in the downconverter path (i.e., RX path) of the UDC circuit 140 may have [at least] two inputs and one output. One of the inputs of the mixer 144 may include an input from the amplifier 142, which may, e.g., be a low-noise amplifier (LNA). The second input of the mixer 144 may include an input indicative of the LO signal 160. In some embodiments, phase shifting may be implemented in the LO path (additionally or alternatively to the phase shifting in the RF path), in which case the LO signal 160 may be provided, first, to a phase shift module 150, and then a phase-shifted LO signal 160 is provided as the second input to the mixer 144. In the embodiments where phase shifting in the LO path is not implemented, the phase shift module 150 may be absent and the second input of the mixer 144 may be configured to receive the LO signal 160. The one output of the mixer 144 is an output to provide the downconverted signal 156, which may, e.g., be an IF signal 156. The mixer 144 may be configured to receive an RF RX signal from the RX path of one of the beamformers 122, after it has been amplified by the amplifier 142, at its first input and receive either a signal from the phase shift module 150 or the LO signal 160 itself at its second input, and mix these two signals to downconvert the RF RX signal to a lower frequency, producing the downconverted RX signal 156, e.g., the RX signal at the IF. Thus, the mixer 144 in the downconverter path of the UDC circuit 140 may be referred to as a "downconverting mixer."

In some embodiments, the mixer 148 in the upconverter path (i.e., TX path) of the UDC circuit 140 may have [at least] two inputs and one output. The first input of the mixer 148 may be an input for receiving a TX signal 158 of a lower frequency, e.g., the TX signal at IF. The second input of the mixer 148 may include an input indicative of the LO signal 160. In the embodiments where phase shifting is implemented in the LO path (either additionally or alternatively to the phase shifting in the RF path), the LO signal 160 may be provided, first, to a phase shift module 150, and then a phase-shifted LO signal 160 is provided as the second input to the mixer 148. In the embodiments where phase shifting in the LO path is not implemented, the phase shift module 150 may be absent and the second input of the mixer 148 may be configured to receive the LO signal 160. The one output of the mixer 148 is an output to the amplifier 146, which may, e.g., be a power amplifier (PA). The mixer 148 may be configured to receive an IF TX signal 158 (i.e., the lower frequency, e.g. IF, signal to be transmitted) at its first input and receive either a signal from the phase shift module 150 or the LO signal 160 itself at its second input, and mix these two signals to upconvert the IF TX signal to the desired RF frequency, producing the upconverted RF TX signal to be provided, after it has been amplified by the amplifier 146, to the TX path of one of the beamformers 122. Thus, the mixer 148 in the upconverter path of the UDC circuit 140 may be referred to as a "upconverting mixer."

As is known in communications and electronic engineering, an IF is a frequency to which a carrier wave is shifted as an intermediate step in transmission or reception. The IF signal may be created by mixing the carrier signal with an LO signal in a process called heterodyning, resulting in a signal at the difference or beat frequency. Conversion to IF may be useful for several reasons. One reason is that, when several stages of filters are used, they can all be set to a fixed frequency, which makes them easier to build and to tune. Another reason is that lower frequency transistors generally have higher gains so fewer stages may be required. Yet another reason is to improve frequency selectivity because it may be easier to make sharply selective filters at lower fixed frequencies. It should also be noted that, while some descriptions provided herein refer to signals 156 and 158 as IF signals, these descriptions are equally applicable to embodiments where signals 156 and 158 are baseband signals. In such embodiments, frequency mixing of the mixers 144 and 148 may be a zero-IF mixing (also referred to as a "zero-IF conversion") in which the LO signal 160 used to perform the mixing may have a center frequency in the band of RF RX/TX frequencies.

Although not specifically shown in FIG. 1, in further embodiments, the UDC circuit 140 may further include a balancer, e.g., in each of the TX and RX paths, configured to mitigate imbalances in the in-phase and quadrature (10) signals due to mismatching. Furthermore, although also not specifically shown in FIG. 1, in other embodiments, the antenna apparatus 100 may include further instances of a combination of the phased array antenna 110, the beamformer array 120, and the UDC circuit 140 as described herein, e.g., a combination described with reference to FIG. 2.

The controller 170 may include any suitable device, configured to control operation of various parts of the antenna apparatus 100. For example, in some embodiments, the controller 170 may control the amount and the timing of phase shifting implemented in the antenna apparatus 100. In another example, in some embodiments, the controller 170 may control calibration of the antenna elements 112.

The antenna apparatus 100 can steer an electromagnetic radiation pattern of the phased array antenna 110 in a particular direction, thereby enabling the phased array antenna 110 to generate a main beam in that direction and side lobes in other directions. The main beam of the radiation pattern is generated based on constructive inference of the transmitted RF signals based on the transmitted signals' phases. The side lobe levels may be determined by the amplitudes of the RF signals transmitted by the antenna elements. The antenna apparatus 100 can generate desired antenna patterns by providing phase shifter settings for the antenna elements 112, e.g., using the phase shifters of the beamformers 122 and/or the phase shift module 150.

Figure 2:
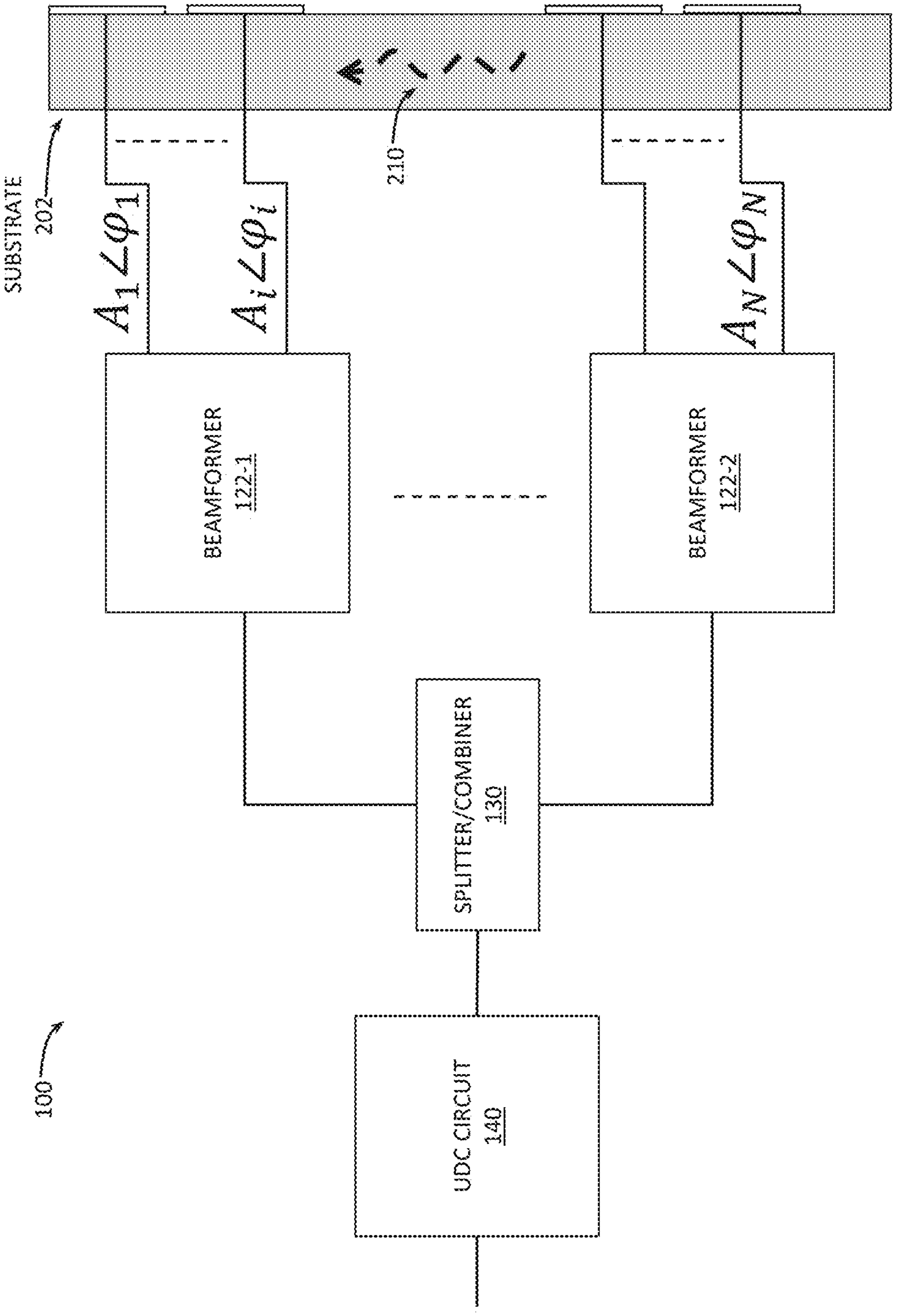
FIG. 2 provides a schematic illustration of surface-wave excitation in the antenna apparatus of FIG. 1, according to some embodiments of the present disclosure.

FIG. 2 provides a schematic illustration of surface-wave excitation in the antenna apparatus 100 of FIG. 1, according to some embodiments of the present disclosure. In particular, FIG. 2 schematically illustrates a surface wave 210 that may be formed in the substrate 114 of the phased array antenna 110. Different approaches described herein aim to reduce or eliminate surface waves 210 in the substrate 114.

Extending the Scan Range by Providing Openings in a PCB Surface

Figure 3:
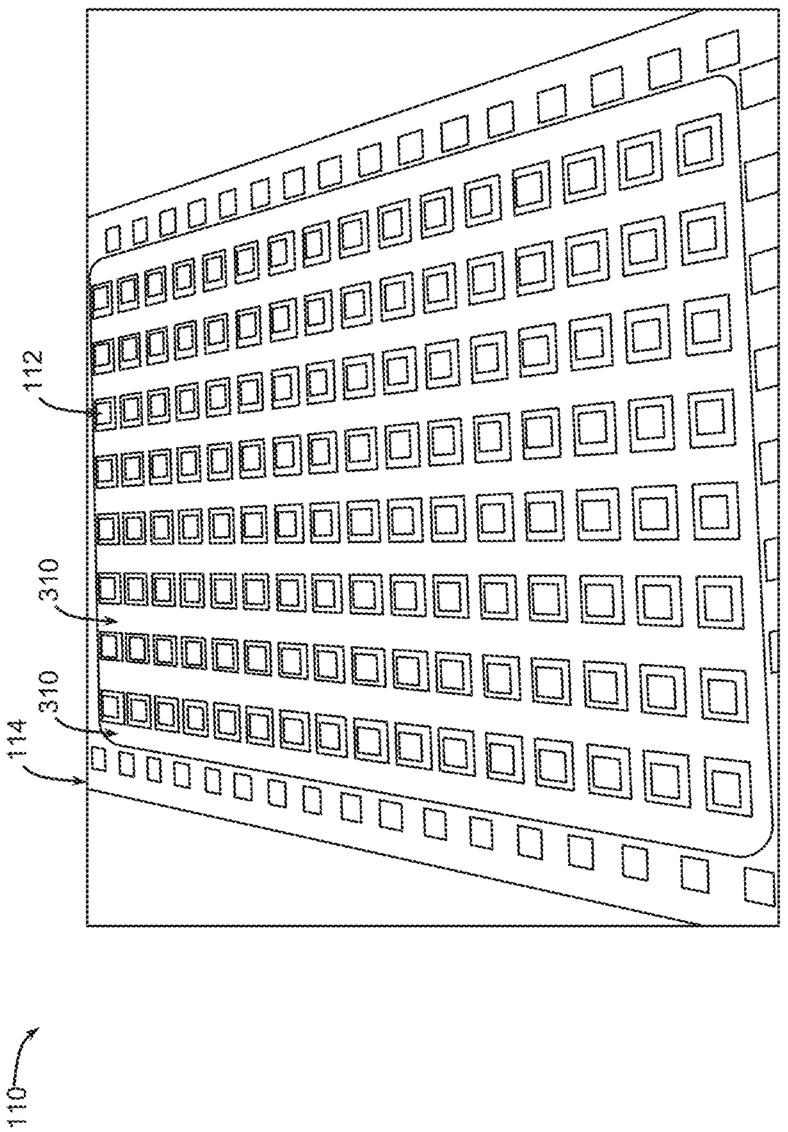
FIG. 3 illustrates an example phased array antenna with trenches, according to some embodiments of the present disclosure.

One approach to extending the scan range of the phased array antenna 110 may include providing openings, e.g., trenches or grooves, at the surface of the substrate 114. FIG. 3 illustrates an example of the phased array antenna 110, indicating the substrate 114, antenna elements 112 arranged in rows and columns, and further illustrating trenches 310, according to some embodiments of the present disclosure.

In general, a trench 310 may be any opening in the surface of the substrate 114. In some embodiments, a depth of the trench 310 may be up to 90% of the overall thickness of the substrate 114, provided the trenches 310 do not compromise structural and mechanical integrity of the substrate 114. A width of the trench 310 may be as large as the space between the antenna elements 112 permits. For example, in some embodiments, a width of the trench 310 may be between about 2 and 5 millimeters for an antenna array operating at 30 GHz, including all values and ranges therein. Although only two specific trenches 310 are labeled in FIG. 3 in order to not clutter the drawing, in general, the trenches 310 may be provided between some or all adjacent rows and/or columns of the antenna elements 112. Furthermore, although the trenches 310 are illustrated in FIG. 3 as being substantially straight lines, in general, the trenches 310 may take on any geometry, e.g., depending on the arrangement of the antenna elements 112, which arrangement may, but does not have to be, an array-like as shown in FIG. 3.

In some embodiments, the trenches 310 may be formed by milling or drilling. In other embodiments, the trenches 310 may be formed by etching the surface of the substrate 114 using any suitable etching technique (e.g., using a dry etch, such as e.g., RF reactive ion etch (RIE) or inductively coupled plasma (ICP) RIE) in combination with lithography (e.g., photolithography or electron-beam lithography) to define the locations and the dimensions of the trenches 310. In some embodiments, the etch performed to form the trenches 310 may include an anisotropic etch, using etchants in a form of e.g., chemically active ionized gas (i.e., plasma) using e.g., bromine (Br) and chloride (CI) based chemistries. In some embodiments, during the etch to form the trenches 310, the substrate 114 may be heated to elevated temperatures, e.g., to temperatures between about room temperature and 200 degrees Celsius, including all values and ranges therein, to promote that byproducts of the etch are made sufficiently volatile to be removed from the surface.

In some embodiments, the trenches 310 may be formed after the antenna elements 112 have been provided in the phased array antenna 110. In other embodiments, the trenches 310 may be formed before the antenna elements 112 have been provided in the phased array antenna 110.

Because the trenches 310 may be filled with air, which has the lowest dielectric constant possible, providing the trenches 310 in the substrate 114 effectively reduces the dielectric constant of the substrate 114, leading to a smaller dielectric constant gradient at the interface of the substrate 114 and surrounding media such as air, thereby reducing surface-wave excitation and extending the scan range. The trenches 310 may be a particularly attractive choice for phased array antennas because they are easy to manufacture and may reduce or eliminate the need to use exotic and expensive low-k dielectric materials.

Figure 4A:
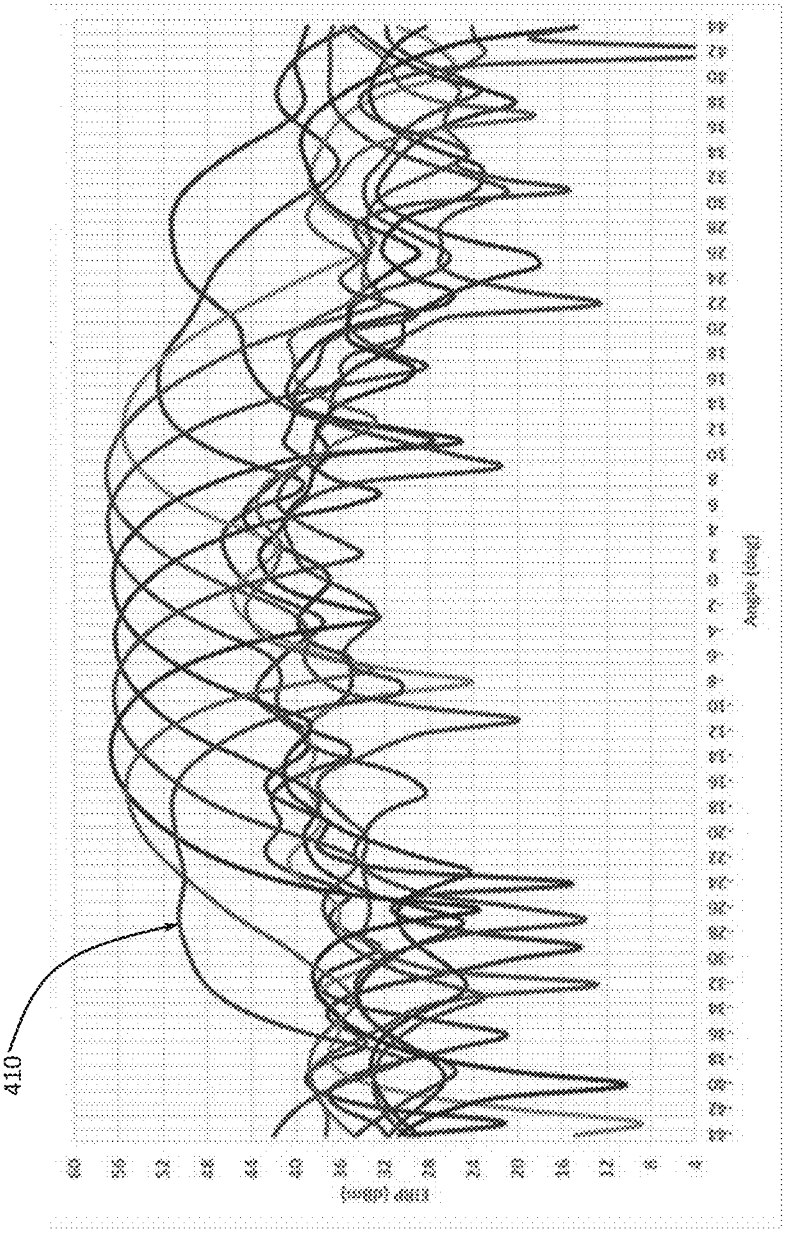
FIG. 4A illustrates an effective isotropic radiated power (EIRP) as a function of a scan angle for different antenna elements of a phased array antenna without trenches, according to some embodiments of the present disclosure.
Figure 4B:
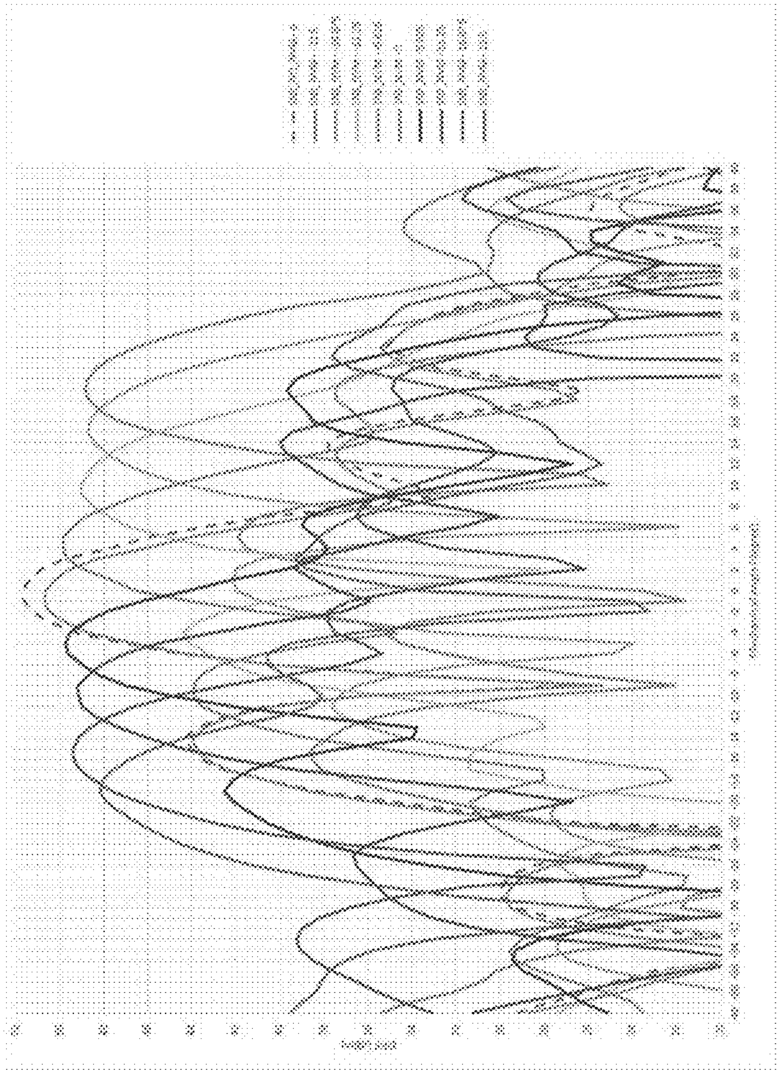
FIG. 4B illustrates an EIRP as a function of a scan angle for different antenna elements of a phased array antenna with trenches, according to some embodiments of the present disclosure.

FIGS. 4A and 4B illustrate an EIRP as a function of a scan angle for different antenna elements of a phased array antenna without and with the trenches 310, respectively, according to some embodiments of the present disclosure. For example, a curve 410, labeled in FIG. 4A, illustrates the loss in power due to surface-wave excitation for a phased array antenna such as the phased array antenna 110 without the trenches 310. On the other hand, curves shown in FIG. 4B exhibit significantly smaller loss in power, if any, due to the use of the trenches 310 in a phased array antenna such as the phased array antenna 110.

Figure 5:
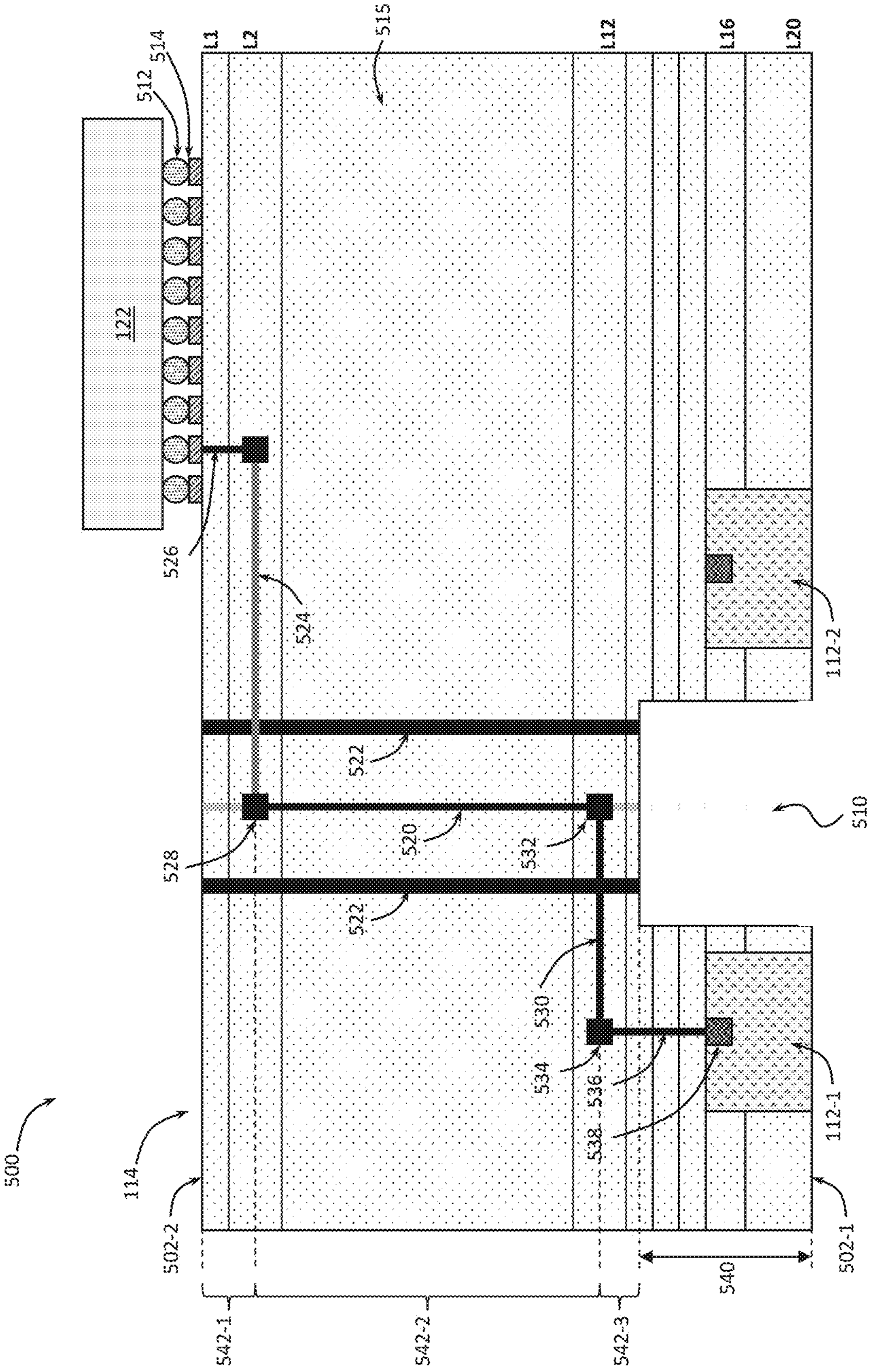
FIG. 5 illustrates a schematic cross-sectional side view of an example antenna assembly with a substrate having a recess between antenna elements, according to some embodiments of the present disclosure.

FIG. 5 illustrates a schematic cross-sectional side view of an example antenna assembly 500 with a substrate 114 (e.g., a package substrate) having a recess between antenna elements 112, according to some embodiments of the present disclosure. As shown in FIG. 5, the antenna assembly 500 may include a first antenna element 112-1 and a second antenna element 112-2 provided at a first face 502-1 of the substrate 114. A beamformer 122 may be electrically coupled to a second face 502-2 of the substrate 114. In various embodiments of the antenna assembly 500, the beamformer 122 may be a provided as a stand-alone integrated circuit (IC) die with beamformer circuitry as described herein, or an IC package (e.g., an IC die with beamformer circuitry coupled to a package substrate). In some embodiments, the beamformer 122 may be a multi-channel beamformer (i.e., the IC die of the beamformer 122 may include multi-channel beamformer circuitry), configured to communicate signals to/from a plurality of the antenna elements 112, e.g., to/from the first and second antenna elements 112 of the antenna assembly 500. The antenna assembly 500 may be used to implement a portion of the antenna apparatus 100 of FIG. 1 and the substrate 114 and the antenna elements 112 of the antenna assembly 500 may be used to implement the antenna array 110 of the antenna apparatus 100 of FIG. 1 (e.g., the antenna array 110 as shown in FIG. 3), as indicated in FIG. 5 by some of the same reference numerals as those used in FIG. 1 and FIG. 3.

In some embodiments, in order to couple the beamformer 122 to the substrate 114, a plurality of die-to-package substrate (DTPS) interconnects 512 may be used, as shown in FIG. 5. In some embodiments, a plurality of pads 514 may be provided at the second face 502-1 of the substrate 114, where each of the DTPS interconnects 512 may be disposed over a corresponding one of the pads 514. Therefore, the pads 514 may be referred to as "beamformer pads."

In various embodiments, the DTPS interconnects 512 may take any suitable form. For example, the DTPS interconnects 512 may include solder (e.g., solder bumps or balls). Although the DTPS interconnects 512 are shown in FIG. 5 as balls (e.g., the DTPS interconnects 512 may be conductive balls, arranged in a ball grid array (BGA) or a land grid array (LGA)), in other embodiments, the DTPS interconnects 512 may take any suitable form, e.g., any conductive bumps or pillars. For example, in some embodiments, the DTPS interconnects 512 may include solder (e.g., solder bumps or balls that are subject to a thermal reflow to form the interconnects 712). In some embodiments, the DTPS interconnects 512 that include solder may include any appropriate solder material, such as lead/tin, tin/bismuth, eutectic tin/silver, ternary tin/silver/copper, eutectic tin/copper, tin/nickel/copper, tin/bismuth/copper, tin/indium/copper, tin/zinc/indium/bismuth, or other alloys. In other embodiments, the DTPS interconnects 512 may be metal-to-metal interconnects (e.g., copper-to-copper interconnects, or plated interconnects). The pads 514 may, in general, be any suitable conductive contacts (e.g., pads or posts, e.g., copper pads or posts), to assist routing power, ground, and signals from the beamformer 122 to interconnects in the substrate 114.

As shown in FIG. 5, the substrate 114 may include a plurality of layers, labeled as layers L1 through L20, although in other embodiments, any other number of layers may be used, and descriptions provided herein with reference to specific layers, e.g., with reference to layers L2 or L12, shown in FIG. 5, are equally applicable to these layers being other layers of the substrate 114. In some embodiments, the layers L may be lamination layers. In general, a "lamination layer" is one of the layers of a lamination stack where a layer of conductive lines is provided. As is known in the field of semiconductor and PCB manufacturing, conductive lines are provided in different planes of the substrate 114, while conductive vias are provided substantially perpendicular to the planes of the substrate 114, to provide electrical connectivity between conductive lines of different planes. In general, any suitable conductive material may be used to implement conductive lines and vias as described herein, e.g., copper, nickel, titanium, aluminum, or alloys and various mixed compound of such materials. Various conductive lines and vias of the substrate 114 may be electrically isolated from one another and from various components included in/on the substrate 114, except for portions where they are electrically coupled, with an insulator material 515. The insulator material 515 may be any suitable interlayer dielectric material, such as silicon dioxide, carbon-doped oxide, silicon nitride, fused silica glass, and so on. In some embodiments, a plurality of lamination layers closest to the beamformer 122 (i.e., closest to the second face 502-2 of the substrate 114) may be referred to as "top lamination" layers, while a plurality of lamination layers closest to the antenna elements 112 (i.e., closest to the first face 502-1 of the substrate 114) may be referred to as "bottom lamination" layers. For example, layers L1-L12 of the antenna assembly 500 may be considered to be top lamination layers, while layers L13-L20 may be considered to be bottom lamination layers.

As shown in FIG. 5, a signal via 520 may be used to connect one of the DTPS interconnects 512 to one of the antenna elements 112, e.g., to the first antenna element 112-1, to communicate signals between the beamformer 122 and the first antenna element 112-1. As is known in the field of microwave engineering, one or more ground vias 522 may be provided proximate to the signal via 520, to shield the signal via 520 from electromagnetic interference from various other components. In some embodiments, one of the In some embodiments, one of the DTPS interconnects 512 may be connected to the signal via 520 using a conductive line 524 provided below the second face 502-2, e.g., in the layer L2, as shown in FIG. 5. To that end, on one side, the conductive line 524 may be connected to the one of the DTPS interconnects 512 using a via 526, and, on the other side, the conductive line 524 may be connected a point 528 of the signal via 520. In some embodiments, the signal via 520 may further be coupled to the first antenna element 112-1 using a conductive line 530, also provided below the second face 502-2, and, furthermore, provided below (i.e., closer to the first face 502-1) the layer in which the conductive line 524 is provided, e.g., in the layer L12, as shown in FIG. 5. To that end, on one side, the conductive line 530 may be connected to a point 532 of the signal via 520, and, on the other side, the conductive line 530 may be coupled, at a point 534, to a conductive via 536 that is coupled to a port 538 of the first antenna element 112-1. As shown in FIG. 5, the first and second antenna elements 112 may be implemented in multiple lamination layers of the substrate 114, e.g., in layers L16-L20. For example, in some embodiments, each of the antenna elements 112 described herein may be a stacked patch antenna, with different patches stacked in different lamination layers of the substrate 114.

In conventional implementations, signal vias for coupling one of the beamformer channels to one of the antenna elements 112 extend all the way between the first face 502-1 and the second face 502-2 of the substrate 114. In such implementations, only the portion of the signal 520 via extending from the point 528 to the point 532 is used to communicate signals, and the remaining portions of the signal via 520, namely, a portion between the point 528 and the second face 502-2 and a portion between the point 532 and the first face 502-1 are not used. Such portions may be referred to as "dangling" portions. Because conductive vias (or various other conductive interconnects) provided in the vicinity of the antenna elements 112 may negatively impact functionality of the antenna elements 112 (e.g., by contributing to parasitic capacitance), in conventional implementations, portions of the signal vias 520 between the point 532 and the first face 502-1 may be backdrilled. In this context, "backdrilling" refers to the process of removing at least some of the electrically conductive materials from these dangling via portions, in order to reduce the parasitic capacitance in the vicinity of the antenna elements 112.

In sharp contrast to such conventional implementations, embodiments of the present disclosure are based on providing air gaps or trenches in areas where otherwise such signal vias 520 would have to be backdrilled. This is shown in FIG. 5 with a recess 510, provided with respect to the first face 502-1 of the substrate 114, and extending into the substrate 114 by a depth 540. The recess 510 may be provided between the first and second antenna elements 112, thus serving as an air gap 310, described above. Such embodiments are based on a realization of the inventors of the present disclosure that 1) back drilling adds additional complexity to the manufacturing of antenna assemblies, and 2) providing a recess 510 in the first face 502-1 of the substrate 114, between the first antenna element 112-1 and the second antenna element 112-2 in such a manner as to eliminate the dangling portions of the signal via 520 between the point 532 and the first face 502-1 may both reduce the parasitic capacitance of the antenna assembly 500 and reduce the dielectric constant of the substrate 114, thus extending the scan range of the antenna assembly 500.

As shown in FIG. 5, the recess 510 may be such that a footprint of the signal via 520 may be within a footprint of the recess 510. As used herein, the term "footprint" may be used to describe a projection of an element (e.g., the signal via 520) onto a plane that is parallel to the first or second faces 502 of the substrate 114. As also shown in FIG. 5, at least some of the ground vias 522 associated with the signal via 520 may be such that their footprints are also within the footprint of the recess 510. Although not specifically shown in FIG. 5, a signal via similar to the signal via 520 may electrically couple another one of the DTPS interconnects 512 and the second antenna element 112-2. Such another signal via is not shown in FIG. 5 because it could be provided in a cross-section different from that shown in FIG. 5, e.g., behind the signal via 520 (i.e., behind the plane of the drawing). In such embodiments, the recess 510 may extend in the direction perpendicular to the plane of the drawing of FIG. 5, e.g., as a trench in the first face 502-1 of the substrate 114, so that such second signal via would also have a footprint that is within the footprint of the recess 510. Examples of such trenches are shown in the top-down view of FIG. 6.

Thus, when the recess 510 is implemented, the signal via 520 may extend between the recess 510 and the second face 502-2 of the substrate 114. In particular, the signal via 520 may be seen as including three portions 542: a first portion 542-1, a second portion 542-2, and a third portion 542-3. The first portion 542-1 may extend between the second face 502-1 of the substrate 114 and the point 528. The second portion 542-2 may extend between the point 528 and the point 532. The third portion 542-3 may extend between the point 532 and the bottom of the recess 510. In some embodiments, the length of each of the first portion 542-1 and the third portion 542-3 may be smaller than the length of the second portion 542-2, e.g., at least 5 times smaller, e.g., at least 10 times smaller or at least 15 times smaller.

Looking at the recess 510 and the arrangement of the antenna elements 112 and the conductive lines 524 and 530, in some embodiments, the recess 510 may extend further into the substrate 114 than at least one of the first antenna element 112-1 and the second antenna element 112-2, as is shown in FIG. 5. Furthermore, in some embodiments, the plane of the conductive line 530 may be between the plane of the end of the recess 510 and the plane of the conductive line 524, while the plane of the conductive line 530 may be between the second face 502-2 of the substrate 114 and the plane of the conductive line 530.

Figure 6:
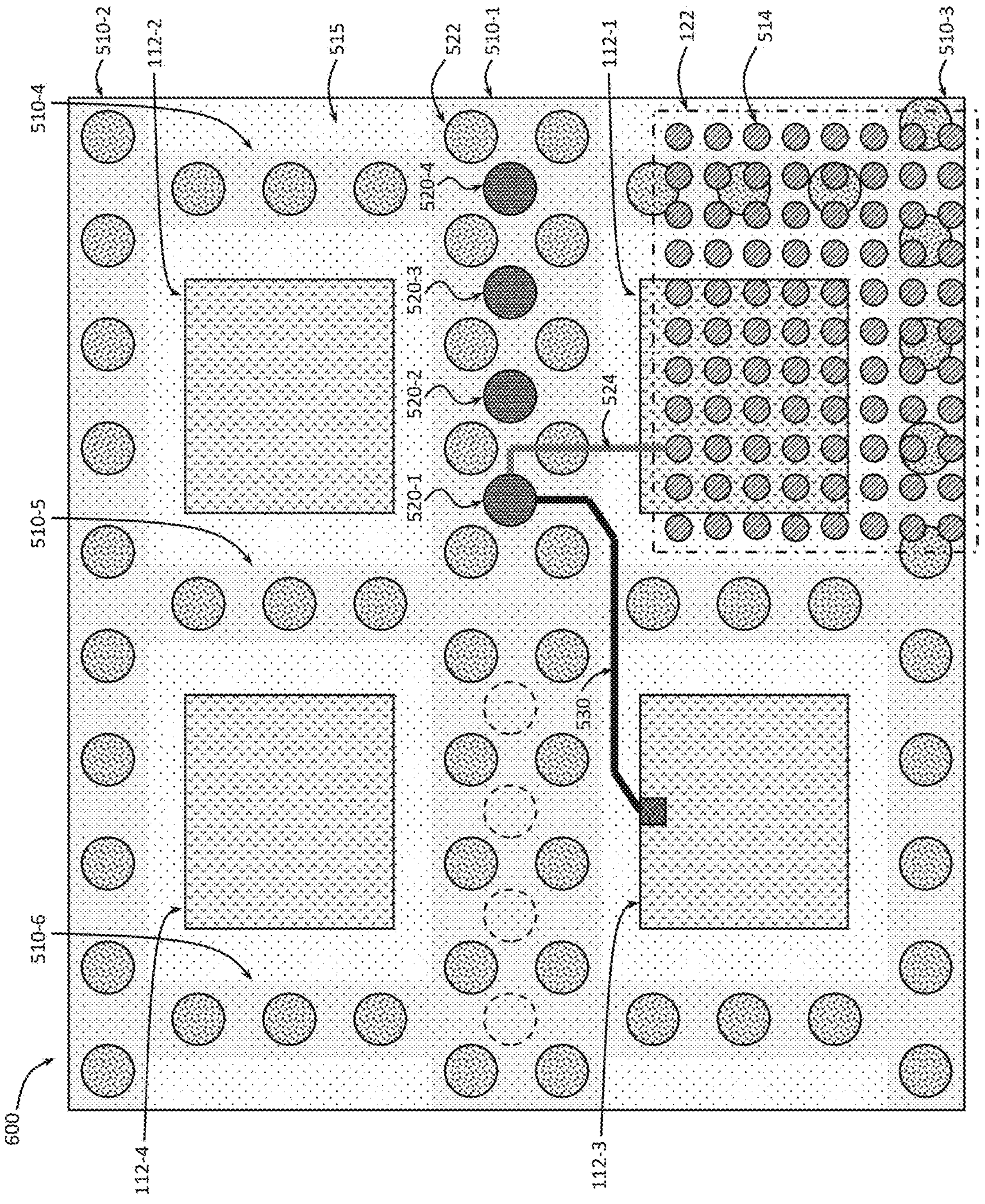
FIG. 6 illustrates a schematic top-down view of an example antenna assembly with a substrate having a recess between antenna elements, according to some embodiments of the present disclosure.

FIG. 6 illustrates a schematic top-down view of an example antenna assembly 600 with a substrate 114 (e.g., a package substrate) having a recess between antenna elements 112, according to some embodiments of the present disclosure. The antenna assembly 600 may be an example top-down view of the antenna assembly 500, shown in FIG. 5. To that end, the first and second antenna elements 112-1 and 112-2 are shown in FIG. 6, as well as an outline of the recess 510-1 (which is an example of the recess 510 of FIG. 5), extending as a trench between the antenna elements 112-1 and 112-2. In particular, the top-down view of the antenna assembly 600 illustrates various elements but not necessarily all of these elements will be in the same top-down cross-section, or in the same plane parallel to the plane of the substrate 114. Descriptions provided below will explain which elements shown in FIG. 6 are provided in which planes.

As shown in FIG. 6, in some embodiments, an antenna array of the antenna assembly 600 may include additional antenna elements, as was described with reference to FIG. 1 and FIG. 3, and as is shown in FIG. 6 by further illustrating a third antenna element 112-3 and a fourth antenna element 112-4. As shown in FIG. 6, in some embodiments, the recess 510-1 may extend as a trench with the antenna elements 112-1 and 112-3 being on one side of the trench, and the antenna elements 112-2 and 112-4 being on the other side of the trench. In addition, in some embodiments, the antenna assembly 600 may include other recesses, shown in FIG. 6 as recesses 510-2 through 510-6, arranged substantially symmetrically with respect to the antenna elements 112. Such symmetric arrangement of multiple trenches of recesses 510 may be advantageous in terms of providing an environment in which different antenna elements 112 see substantially the same impedance within the antenna assembly 600.

In some embodiments, a width of the trench of at least some of the recesses 510 may be between about 10% and 40% of a distance between the adjacent antenna elements 112. For example, a width of the recess 510-1 may be between about 10% and 40% of a distance between the first antenna element 112-1 and the second antenna element 112-2. In some of the embodiments, a depth of the trench of at least some of the recesses 510 may be between about 50% and 100% of the thickness of the entire antenna assembly, e.g., between about 10% and 80% of the thickness of the substrate 114.

In some embodiments, the beamformer 122 may be arranged above the second face 502-2 of the substrate 114 of the antenna assembly 600 as is shown in FIG. 6 with a dash-dotted outline 122. Small dots within the outline of the beamformer 122 illustrate beamformer pads 514 (hence, one of these dots is labeled in FIG. 6 with a reference numeral "514"), as described above, provided at the second face 502-2 of the substrate 114, thus indicating the locations of the corresponding DTPS interconnects 512. The perimeter of the beamformer 122 shown in FIG. 6 may extend further (e.g., further down and further to the right of the drawing).

The signal via 520 as described with reference to FIG. 5, may be arranged within the recess 510-1 of FIG. 6, substantially between the first antenna element 112-1 and the second antenna element 112-2, e.g., as a signal via 520-1, labeled in FIG. 6. Examples of the conductive lines 524 and 530, coupled to different points of the signal via 520-1, as described with reference to FIG. 5, are also shown in FIG. 6. As described above, the conductive lines 524 and 530 are provided in different planes within the substrate 114. Because there are four antenna elements 112 shown in the illustration of FIG. 6, additional signal vias 520-2, 520-3, and 520-4 are shown in FIG. 6, each of which may be used to couple one of the antenna elements 112-2, 112-3, and 112-4 to a different one of the DTPS interconnects 512 of the multi-channel beamformer 122. Descriptions provided with respect to the signal via 520-1 are applicable to other signal vias 520 of the antenna assembly 600 and, therefore, details of the connections of these other signal vias 520 (e.g., examples of the respective conductive lines 524 and 530 for these other signal vias) are not shown in FIG. 6 in order to not clutter the drawing, and are not repeated for each signal via 520 individually.

FIG. 6 further illustrates ground vias 522 as described above, only one of which is labeled in FIG. 6 with a reference numeral in order to not clutter the drawings. In some embodiments, various ones of the ground vias 522 may extend between the second face 502-2 of the substrate 114 and the respective recess 510, illustrated in FIG. 6.

In some embodiments, a plurality of signal vias 520 may be arranged within the footprint of a single recess 510, as is shown in FIG. 6 with the footprints of all of the signal vias 520-1 through 520-4 being within the footprint of the recess 510-1. In particular, in some embodiments, a group of such signal vias for different antenna elements 112 may be arranged closer to some antenna elements than to others. For example, in FIG. 6, the signal vias 520-1 through 520-4 are closer to the first antenna element 112-1 and the second antenna element 112-2 than they are to the third antenna element 112-3 and the fourth antenna element 112-4. Such a scenario was also possible for conventional implementations of antenna assemblies. However, in conventional implementations where back drilling was performed, dummy signal vias (i.e., signal vias not connected to anything) would still need to be provided in other areas of the antenna assembly 600, e.g., between the third antenna element 112-3 and the fourth antenna element 112-4 as illustrated in FIG. 6 with dashed circles, in order to provide a symmetric environment for the antenna elements 112. Such dummy signal vias may be avoided when the recesses 510 are provided as described herein, because the recesses 510 effectively move the signal vias 520 far enough from the antenna elements 112 (i.e., portions of them are no longer between the antenna elements 112) that asymmetric arrangement of the signal vias 520 that end at the recesses 510 do not affect the environment for the antenna elements 112.

Extending the Scan Range by Providing SMT Antenna Elements with Gaps in Between

Another approach to extending the scan range of the phased array antenna 110 may include providing the antenna elements 112 over the substrate 114 in the form of SMT components that are reduced in size/footprint so that gaps may be provided between the antenna elements 112. An example of this is shown in FIG. 7, illustrating an example package 700 that may include a phased array antenna with gaps between antenna elements, according to some embodiments of the present disclosure.

Figure 7:
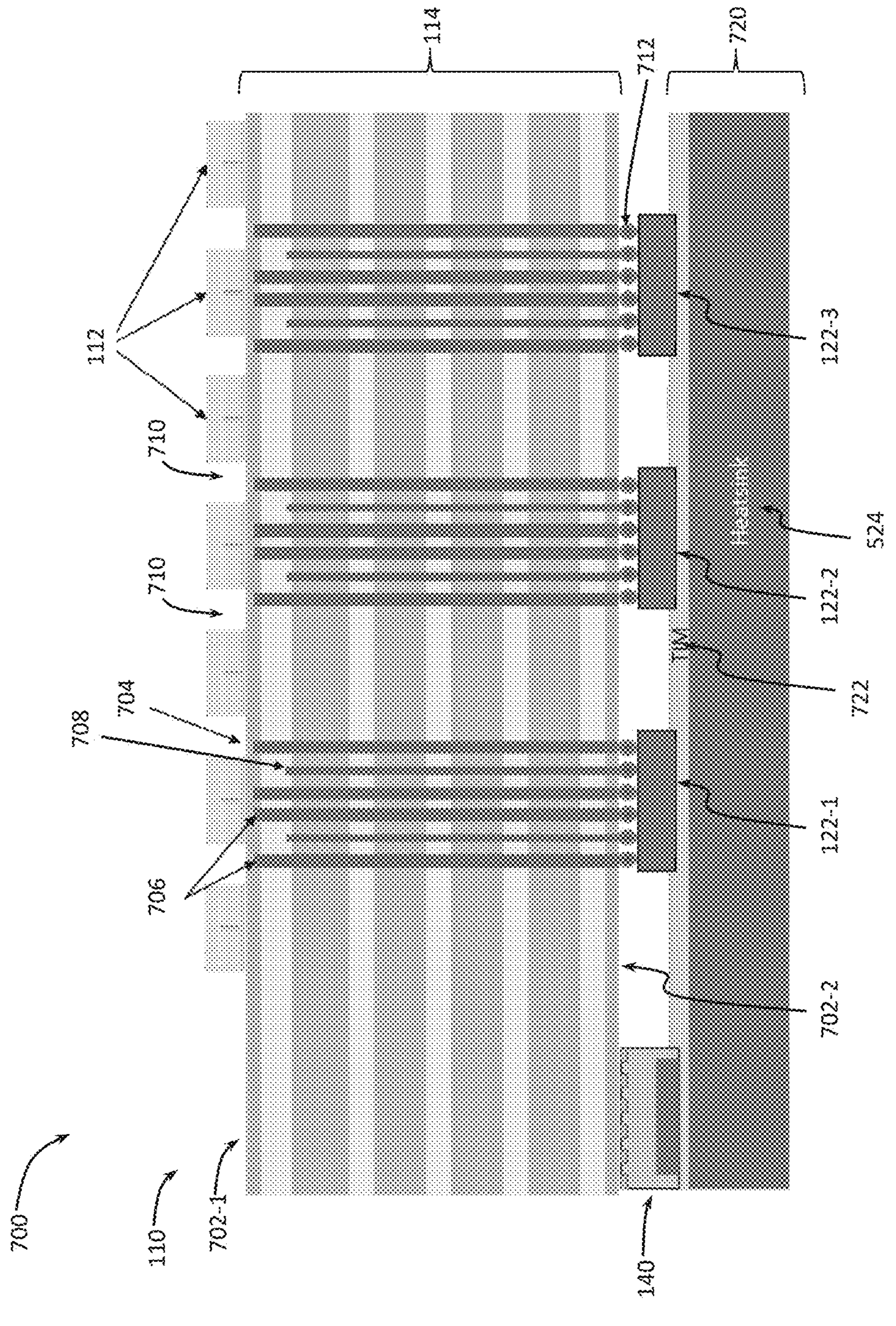
FIG. 7 illustrates an example package with a phased array antenna with gaps between antenna elements, according to some embodiments of the present disclosure.

As shown in FIG. 7, the package 700 may include the phased array antenna 110, where the antenna elements 112 are provided as SMT components over a surface 702-1 of the substrate 114, with gaps 710 in between some or all of the antenna elements 112 (only some of the antenna elements 112 and gaps 710 are labeled in FIG. 7 in order to not clutter the drawings). In some embodiments, the dimensions of the gaps 710 between the antenna elements 112 may be similar to the width of the trenches 310, described above. Similar to the use of the trenches 310, because the gaps 710 may be filled with air, providing the gaps 710 between the SMT antenna elements 112 effectively reduces the difference in the dielectric constants at the interface of the substrate 114 and the surrounding media, leading to a smaller dielectric constant gradient, thereby reducing surface-wave excitation and extending the scan range. Although not specifically shown in FIG. 7, the trenches 310 as described above may be provided in the surface 702-1 of the substrate 114 in some embodiments.

The example shown in FIG. 7 illustrates that in some embodiments, a ground plane 704 may be provided at the surface 702-1 of the substrate 114, and ground vias 706 may be coupled to the ground plane 704. FIG. 7 further illustrates signal vias 708, arranged so that signal vias 708 may be at least partially surrounded by the ground vias 706 along at least a portion of a length of the signal via 708 and separated from the ground vias 706 by a gap, as is known in the field of microwave engineering. The signal vias 708 may provide signal to the antenna elements 112.

In some embodiments, the vias 706 and 708 may extend through the substrate 114, to be coupled to the respective beamformers 122 at a surface 702-2 of the substrate 114, as shown in FIG. 7. An example of the UDC circuit 140 is also illustrated in FIG. 7. In some embodiments, the vias 706/508 may be coupled to the respective beamformers 122 using interconnects 712. Although the interconnects 712 are shown in FIG. 7 as balls (e.g., the interconnects 712 may be conductive balls, arranged in a BGA or a LGA), in other embodiments, the interconnects 712 may take any suitable form, e.g., any conductive bumps or pillars. For example, in some embodiments, the interconnects 712 may include solder (e.g., solder bumps or balls that are subject to a thermal reflow to form the interconnects 712). In some embodiments, the interconnects 712 that include solder may include any appropriate solder material, such as lead/tin, tin/bismuth, eutectic tin/silver, ternary tin/silver/copper, eutectic tin/copper, tin/nickel/copper, tin/bismuth/copper, tin/indium/copper, tin/zinc/indium/bismuth, or other alloys. In other embodiments, the interconnects 712 may be metal-to-metal interconnects (e.g., copper-to-copper interconnects, or plated interconnects).

In some embodiments of the package 700, the beamformers 122 and/or the UDC circuit 140 may be provided over a package substrate 720. In some embodiments, the package substrate 720 may include a thermal interface material (TIM) 722 and a heatsink (also commonly referred to as a "heat spreader") 724. The TIM 722 may include a thermally conductive material (e.g., metal particles) in a polymer or other binder. In some embodiments, the TIM 722 may be a thermal interface material paste or a thermally conductive epoxy (which may be a fluid when applied and may harden upon curing, as known in the art). The TIM 722 may provide a path for heat generated by the beamformers 122 and/or the UDC circuit 140 to readily flow to the heatsink 724, where it may be spread and/or dissipated. The heatsink 724 may include any suitable thermally conductive material (e.g., metal, appropriate ceramics, etc.), and may include any suitable features to dissipate heat.

Figure 8:
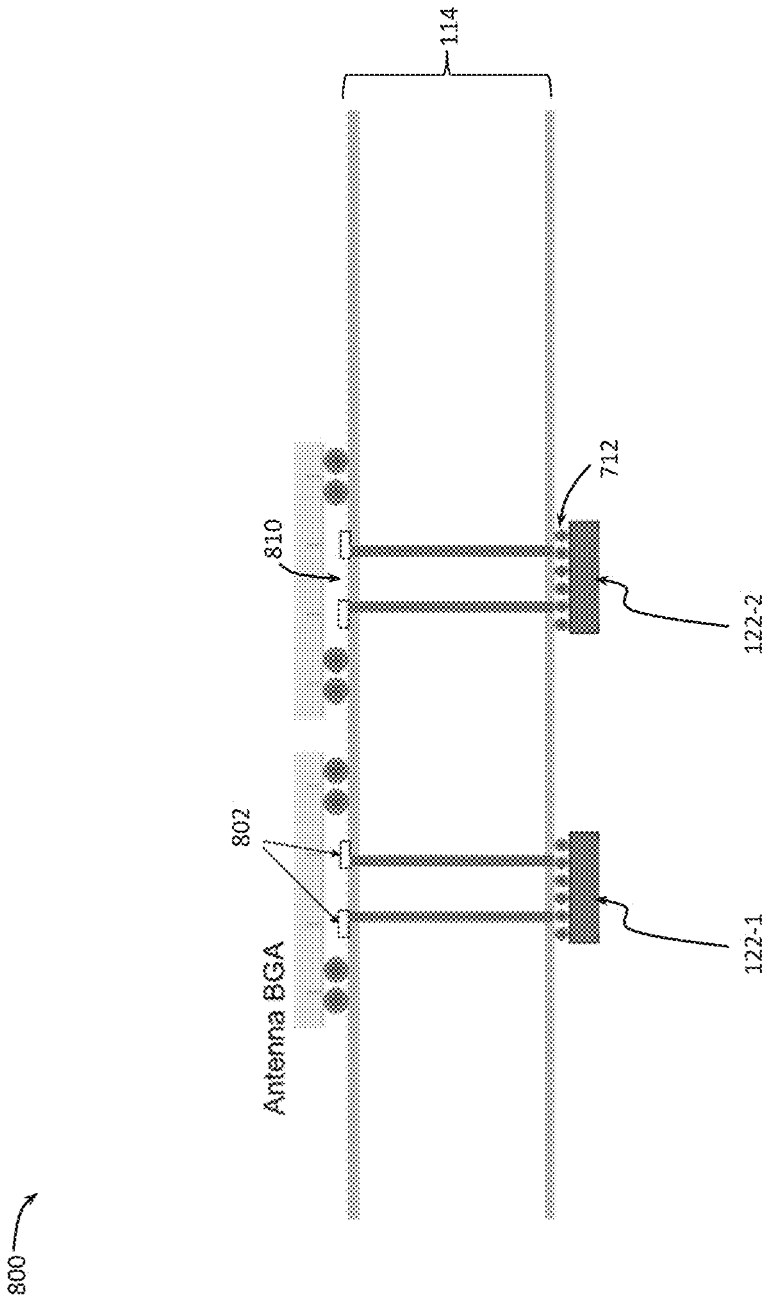
FIG. 8 illustrates an example package with a phased array antenna with additional components placed in gaps between antenna elements, according to some embodiments of the present disclosure.

In further embodiments, at least some of the gaps 710 between the antenna elements 112 may be used to house other components of a phased array antenna. One example is shown in FIG. 8, illustrating an example package 800 with a phased array antenna with additional components 802 placed in gaps between antenna elements, according to some embodiments of the present disclosure.

The package 800 may be similar to the package 700, described above. The additional components 802 may, e.g., be SMT components, such as capacitors or resistors.

Figure 9:
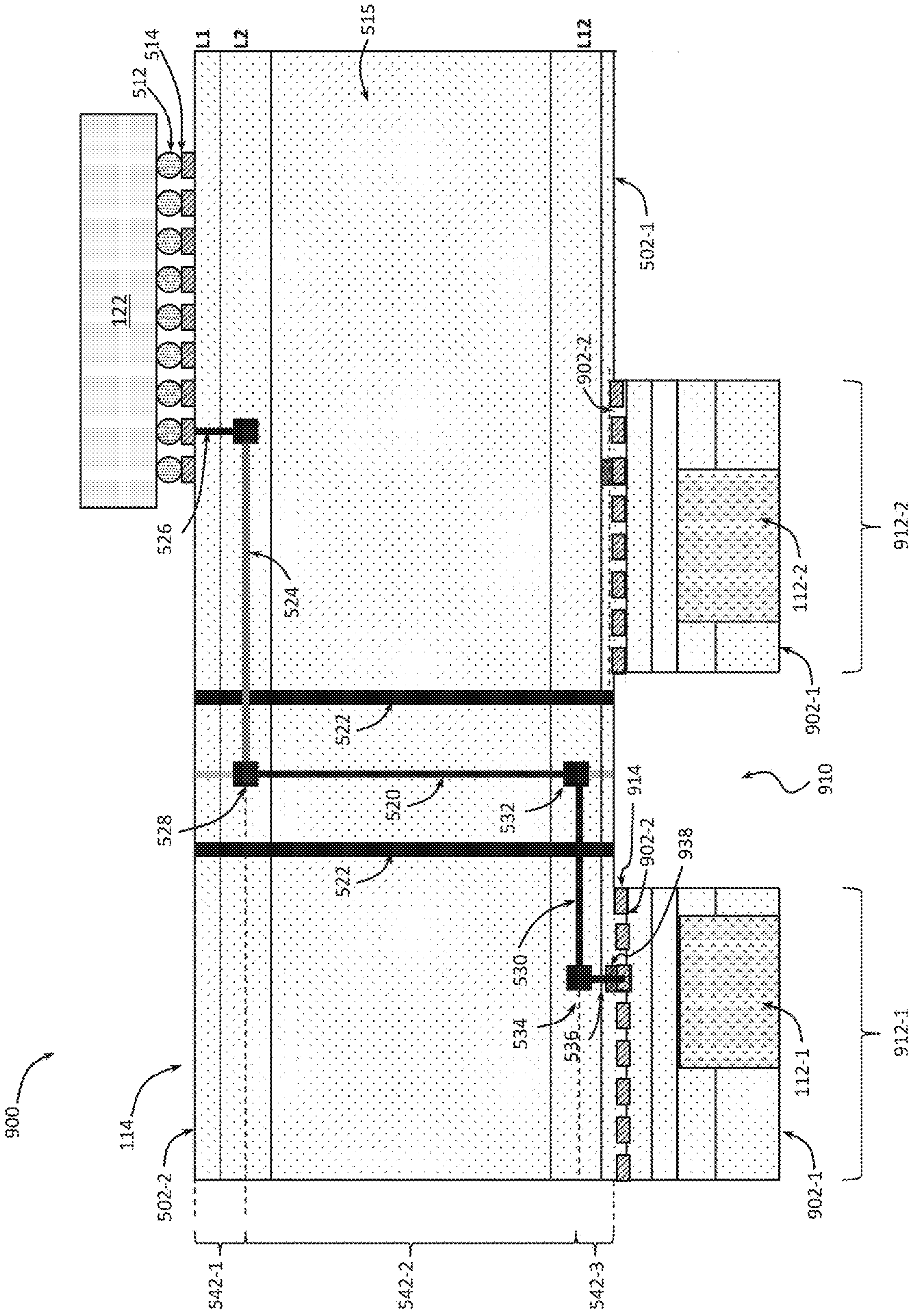
FIG. 9 illustrates a schematic cross-sectional side view of an example antenna assembly with antenna elements implemented as surface mount (SMT) components, according to some embodiments of the present disclosure.

FIG. 9 illustrates a schematic cross-sectional side view of an example antenna assembly 900 with antenna elements implemented as SMT components, according to some embodiments of the present disclosure. The antenna assembly 900 is similar to the antenna assembly 700 of FIG. 7, except that, instead of providing a recess in the first face of the substrate 114, the antenna elements 112-1 and 112-2 are provided as part of respective SMT components 912-1 and 912-2. The conductive via 536, as described above, may then be coupled to a port 938 of a given SMT component 912, e.g., as is shown in FIG. 9 for the SMT component 912-1, where the port 938 is coupled, internally, to the antenna element 112-1 included in that SMT component 912.

FIG. 9 illustrates that each SMT component 912 may include a first face 902-1 and an opposing second face 902-2, and that the second face 902-2 of each of the SMT components 912 may be coupled to the first face 502-1 of the substrate 114, e.g., using a BGA or an LGA, as schematically illustrated in FIG. 9 with interconnects 914. In particular, the SMT components 912 may be arranged so that the footprint of the signal via 520, and, optionally, also of the corresponding ground vias 522, may be within an opening 910 between the SMT components 912.

In some embodiments, each of the SMT components 912 may have a side dimension (e.g., a dimension measured along a horizontal axis of the drawing of FIG. 9) that is between about 0.2 and 0.4 of a free space wavelength of radiation that the antenna element 112 in those SMT components 912 is to send or receive. In some embodiments, each of the SMT components 912 may have a height (e.g., a dimension measured along a vertical axis of the drawing of FIG. 9) that is between about 0.03 and 0.25 of a free space wavelength of radiation that the antenna element 112 in those SMT components 912 is to send or receive. In some embodiments, the distance between the SMT components 912 (i.e., a width of the opening 910) may be between about 0.1 and 0.4 of a free space wavelength of radiation that the antenna element 112 in those SMT components 912 is to send or receive.

Example RF System

Figure 10:
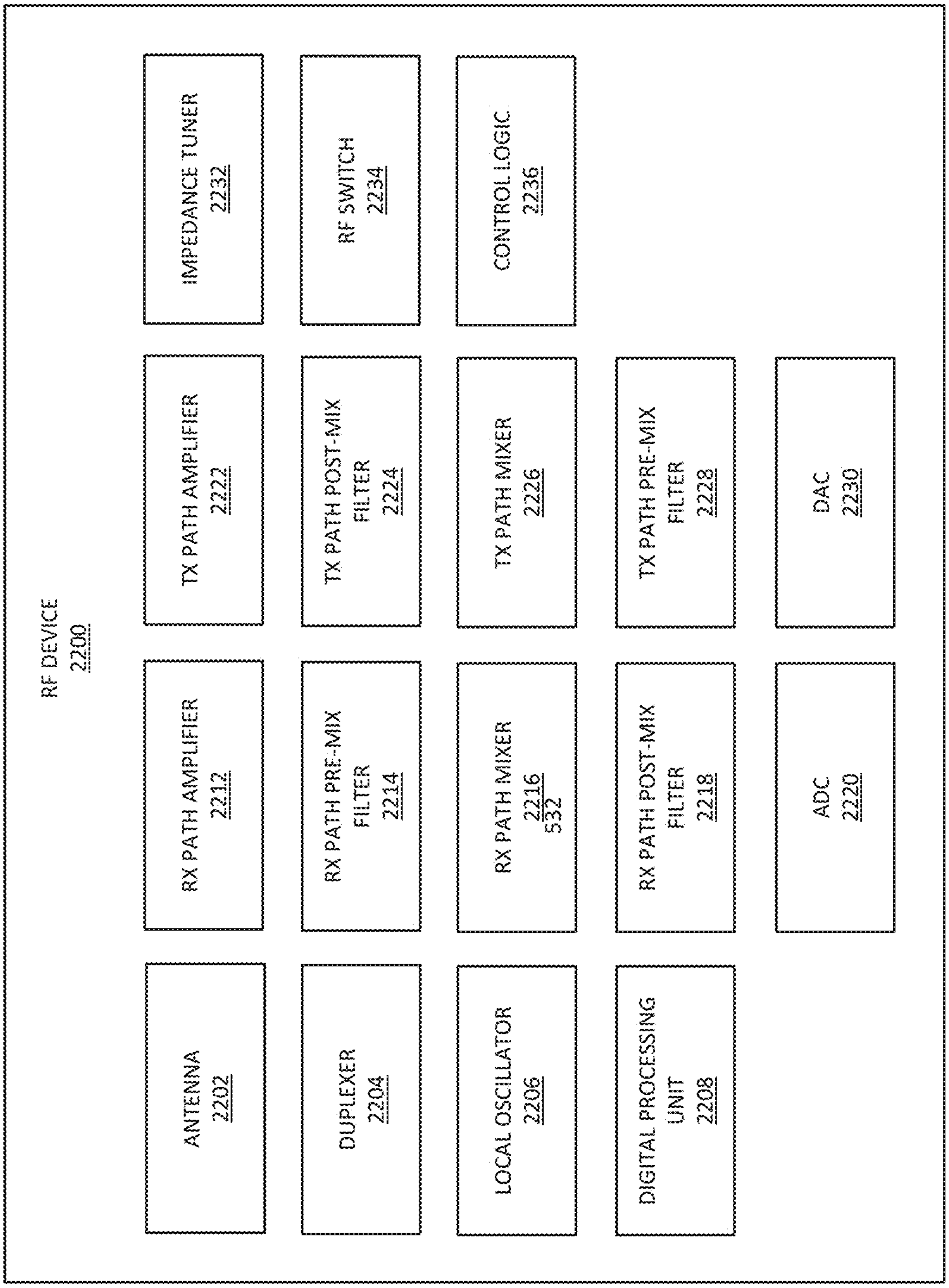
FIG. 10 provides a schematic block diagram illustrating an RF device in which a phased array antenna with extended scan range may be implemented, according to some embodiments of the present disclosure.

In some embodiments, phased array antennas with extended scan range as described herein may be included in various RF devices and systems used in wireless communications. For illustration purposes only, one example RF device that may include any of the phased array antennas with extended scan range described herein is shown in FIG. 10 and described below. However, in general, phased array antennas with extended scan range as described herein may be included in other RF devices and systems, all of which being within the scope of the present disclosure.

FIG. 10 is a block diagram of an example RF device 2200, e.g., an RF transceiver, in which a phased array antenna with extended scan range may be implemented, according to some embodiments of the present disclosure.

In general, the RF device 2200 may be any device or system that may support wireless transmission and/or reception of signals in the form of electromagnetic waves in the RF range of approximately 3 kHz to approximately 300 GHz. In some embodiments, the RF device 2200 may be used for wireless communications, e.g., in a base station (BS) or a user equipment (UE) device of any suitable cellular wireless communications technology, such as GSM, WCDMA, or LTE. In a further example, the RF device 2200 may be used as, or in, e.g., a BS or a UE device of a mm-wave wireless technology such as 5G wireless (i.e., high-frequency/short-wavelength spectrum, e.g., with frequencies in the range between about 20 and 60 GHz, corresponding to wavelengths in the range between about 5 and 15 millimeters). In yet another example, the RF device 2200 may be used for wireless communications using Wi-Fi technology (e.g., a frequency band of 2.4 GHz, corresponding to a wavelength of about 12 cm, or a frequency band of 5.8 GHz, spectrum, corresponding to a wavelength of about 5 cm), e.g., in a Wi-Fi-enabled device such as a desktop, a laptop, a video game console, a smart phone, a tablet, a smart TV, a digital audio player, a car, a printer, etc. In some implementations, a Wi-Fi-enabled device may, e.g., be a node in a smart system configured to communicate data with other nodes, e.g., a smart sensor. Still in another example, the RF device 2200 may be used for wireless communications using Bluetooth technology (e.g., a frequency band from about 2.4 to about 2.485 GHz, corresponding to a wavelength of about 12 cm). In other embodiments, the RF device 2200 may be used for transmitting and/or receiving RF signals for purposes other than communication, e.g., in an automotive radar system, or in medical applications such as MRI.

In various embodiments, the RF device 2200 may be included in frequency-domain duplex (FDD) or time-domain duplex (TDD) variants of frequency allocations that may be used in a cellular network. In an FDD system, the uplink (i.e., RF signals transmitted from the UE devices to a BS) and the downlink (i.e., RF signals transmitted from the BS to the US devices) may use separate frequency bands at the same time. In a TDD system, the uplink and the downlink may use the same frequencies but at different times.

Several components are illustrated in FIG. 10 as included in the RF device 2200, but any one or more of these components may be omitted or duplicated, as suitable for the application. For example, in some embodiments, the RF device 2200 may be an RF device supporting both of wireless transmission and reception of RF signals (e.g., an RF transceiver), in which case it may include both the components of what is referred to herein as a transmit (TX) path and the components of what is referred to herein as a receive (RX) path. However, in other embodiments, the RF device 2200 may be an RF device supporting only wireless reception (e.g., an RF receiver), in which case it may include the components of the RX path, but not the components of the TX path; or the RF device 2200 may be an RF device supporting only wireless transmission (e.g., an RF transmitter), in which case it may include the components of the TX path, but not the components of the RX path.

In some embodiments, some or all the components included in the RF device 2200 may be attached to one or more motherboards. In some embodiments, some or all these components are fabricated on a single die, e.g., on a single system on chip (SOC) die.

Additionally, in various embodiments, the RF device 2200 may not include one or more of the components illustrated in FIG. 10, but the RF device 2200 may include interface circuitry for coupling to the one or more components. For example, the RF device 2200 may not include a digital processing unit 2208 but may include interface circuitry (e.g., connectors and supporting circuitry) to which the digital processing unit 2208 may be coupled. In another example, the RF device 2200 may not include a LO 2206, but may include interface circuitry (e.g., connectors and supporting circuitry) to which the LO 2206 may be coupled.

As shown in FIG. 10, the RF device 2200 may include an antenna 2202, a duplexer 2204 (e.g., if the RF device 2200 is an FDD RF device, and otherwise the duplexer 2204 may be omitted), an LO 2206, a digital processing unit 2208. As also shown in FIG. 10, the RF device 2200 may include an RX path that may include an RX path amplifier 2212, an RX path pre-mix filter 2214, a RX path mixer 2216, an RX path post-mix filter 2218, and an ADC 2220. As further shown in FIG. 10, the RF device 2200 may include a TX path that may include a TX path amplifier 2222, a TX path post-mix filter 2224, a TX path mixer 2226, a TX path pre-mix filter 2228, and a DAC 2230. Still further, the RF device 2200 may further include an impedance tuner 2232, an RF switch 2234, and control logic 2236. In various embodiments, the RF device 2200 may include multiple instances of any of the components shown in FIG. 10. In some embodiments, the RX path amplifier 2212, the TX path amplifier 2222, the duplexer 2204, and the RF switch 2234 may be considered to form, or be a part of, an RF front-end (FE) of the RF device 2200. In some embodiments, the RX path amplifier 2212, the TX path amplifier 2222, the duplexer 2204, and the RF switch 2234 may be considered to form, or be a part of, an RF FE of the RF device 2200. In some embodiments, the RX path mixer 2216 and the TX path mixer 2226 (possibly with their associated pre-mix and post-mix filters shown in FIG. 10) may be considered to form, or be a part of, an RF transceiver of the RF device 2200 (or of an RF receiver or an RF transmitter if only RX path or TX path components, respectively, are included in the RF device 2200). In some embodiments, the RF device 2200 may further include one or more control logic elements/circuits, shown in FIG. 10 as control logic 2236, e.g., an RF FE control interface. In some embodiments, the control logic 2236 may be used to perform functions such as enhance control of complex RF system environment, support implementation of envelope tracking techniques, or reduce dissipated power within the RF device 2200.

The antenna 2202 may be configured to wirelessly transmit and/or receive RF signals in accordance with any wireless standards or protocols, e.g., Wi-Fi, LTE, or GSM, as well as any other wireless protocols that are designated as 3G, 4G, 5G, and beyond. If the RF device 2200 is an FDD transceiver, the antenna 2202 may be configured for concurrent reception and transmission of communication signals in separate, i.e., non-overlapping and non-continuous, bands of frequencies, e.g., in bands having a separation of, e.g., 20 MHz from one another. If the RF device 2200 is a TDD transceiver, the antenna 2202 may be configured for sequential reception and transmission of communication signals in bands of frequencies that may be the same or overlapping for TX and RX paths. In some embodiments, the RF device 2200 may be a multi-band RF device, in which case the antenna 2202 may be configured for concurrent reception of signals having multiple RF components in separate frequency bands and/or configured for concurrent transmission of signals having multiple RF components in separate frequency bands. In such embodiments, the antenna 2202 may be a single wide-band antenna or a plurality of band-specific antennas (i.e., a plurality of antennas each configured to receive and/or transmit signals in a specific band of frequencies). In various embodiments, the antenna 2202 may be an antenna array with extended scan range as described herein. In some embodiments, the RF device 2200 may include more than one antenna 2202 to implement antenna diversity. In some such embodiments, the RF switch 2234 may be deployed to switch between different antennas.

An output of the antenna 2202 may be coupled to the input of the duplexer 2204. The duplexer 2204 may be any suitable component configured for filtering multiple signals to allow for bidirectional communication over a single path between the duplexer 2204 and the antenna 2202. The duplexer 2204 may be configured for providing RX signals to the RX path of the RF device 2200 and for receiving TX signals from the TX path of the RF device 2200.

The RF device 2200 may include one or more LOs 2206, configured to provide LO signals that may be used for downconversion of the RF signals received by the antenna 2202 and/or upconversion of the signals to be transmitted by the antenna 2202.

The RF device 2200 may include the digital processing unit 2208, which may include one or more processing devices. The digital processing unit 2208 may be configured to perform various functions related to digital processing of the RX and/or TX signals. Examples of such functions include, but are not limited to, decimation/downsampling, error correction, digital downconversion or upconversion, DC offset cancellation, automatic gain control, etc. Although not shown in FIG. 10, in some embodiments, the RF device 2200 may further include a memory device, configured to cooperate with the digital processing unit 2208.

Turning to the details of the RX path that may be included in the RF device 2200, the RX path amplifier 2212 may include an LNA. An input of the RX path amplifier 2212 may be coupled to an antenna port (not shown) of the antenna 2202, e.g., via the duplexer 2204. The RX path amplifier 2212 may amplify the RF signals received by the antenna 2202.

An output of the RX path amplifier 2212 may be coupled to an input of the RX path pre-mix filter 2214, which may be a harmonic or band-pass (e.g., low-pass) filter, configured to filter received RF signals that have been amplified by the RX path amplifier 2212.

An output of the RX path pre-mix filter 2214 may be coupled to an input of the RX path mixer 2216, also referred to as a downconverter. The RX path mixer 2216 may include two inputs and one output. A first input may be configured to receive the RX signals, which may be current signals, indicative of the signals received by the antenna 2202 (e.g., the first input may receive the output of the RX path pre-mix filter 2214). A second input may be configured to receive LO signals from one of the LOs 2206. The RX path mixer 2216 may then mix the signals received at its two inputs to generate a downconverted RX signal, provided at an output of the RX path mixer 2216. As used herein, downconversion refers to a process of mixing a received RF signal with an LO signal to generate a signal of a lower frequency. In particular, the TX path mixer (e.g., downconverter) 2216 may be configured to generate the sum and/or the difference frequency at the output port when two input frequencies are provided at the two input ports. In some embodiments, the RF device 2200 may implement a direct-conversion receiver (DCR), also known as homodyne, synchrodyne, or zero-IF receiver, in which case the RX path mixer 2216 may be configured to demodulate the incoming radio signals using LO signals whose frequency is identical to, or very close to the carrier frequency of the radio signal. In other embodiments, the RF device 2200 may make use of downconversion to the IF. IFs may be used in superheterodyne radio receivers, in which a received RF signal is shifted to an IF before the final detection of the information in the received signal is done. In some embodiments, the RX path mixer 2216 may include several stages of IF conversion.

Although a single RX path mixer 2216 is shown in the RX path of FIG. 10, in some embodiments, the RX path mixer 2216 may be implemented as a quadrature downconverter, in which case it would include a first RX path mixer and a second RX path mixer. The first RX path mixer may be configured for performing downconversion to generate an in-phase (I) downconverted RX signal by mixing the RX signal received by the antenna 2202 and an in-phase component of the LO signal provided by the LO 2206. The second RX path mixer may be configured for performing downconversion to generate a quadrature (Q) downconverted RX signal by mixing the RX signal received by the antenna 2202 and a quadrature component of the LO signal provided by the local oscillator 2206 (the quadrature component is a component that is offset, in phase, from the in-phase component of the local oscillator signal by 90 degrees). The output of the first RX path mixer may be provided to a I-signal path, and the output of the second RX path mixer may be provided to a Q-signal path, which may be substantially 90 degrees out of phase with the I-signal path.

The output of the RX path mixer 2216 may, optionally, be coupled to the RX path post-mix filter 2218, which may be low-pass filters. In case the RX path mixer 2216 is a quadrature mixer that implements the first and second mixers as described above, the IQ components provided at the outputs of the first and second mixers respectively may be coupled to respective individual first and second RX path post-mix filters included in the filter 2218.

The ADC 2220 may be configured to convert the mixed RX signals from the RX path mixer 2216 from analog to digital domain. The ADC 2220 may be a quadrature ADC that, like the RX path quadrature mixer 2216, may include two ADCs, configured to digitize the downconverted RX path signals separated in IQ components. The output of the ADC 2220 may be provided to the digital processing unit 2208, configured to perform various functions related to digital processing of the RX signals so that information encoded in the RX signals can be extracted.

Turning to the details of the TX path that may be included in the RF device 2200, the digital signal to later be transmitted (TX signal) by the antenna 2202 may be provided, from the digital processing unit 2208, to the DAC 2230. Like the ADC 2220, the DAC 2230 may include two DACs, configured to convert, respectively, digital I- and Q-path TX signal components to analog form.

Optionally, the output of the DAC 2230 may be coupled to the TX path pre-mix filter 2228, which may be a band-pass (e.g., low-pass) filter (or a pair of band-pass, e.g., low-pass, filters, in case of quadrature processing) configured to filter out, from the analog TX signals output by the DAC 2230, the signal components outside of the desired band. The digital TX signals may then be provided to the TX path mixer 2226, which may also be referred to as an upconverter. Like the RX path mixer 2216, the TX path mixer 2226 may include a pair of TX path mixers, for IQ component mixing. Like the first and second RX path mixers that may be included in the RX path, each of the TX path mixers of the TX path mixer 2226 may include two inputs and one output. A first input may receive the TX signal components, converted to the analog form by the respective DAC 2230, which are to be upconverted to generate RF signals to be transmitted. The first TX path mixer may generate an in-phase (I) upconverted signal by mixing the TX signal component converted to analog form by the DAC 2230 with the in-phase component of the TX path LO signal provided from the LO 2206 (in various embodiments, the LO 2206 may include a plurality of different LOs or may be configured to provide different LO frequencies for the mixer 2216 in the RX path and the mixer 2226 in the TX path). The second TX path mixer may generate a quadrature phase (Q) upconverted signal by mixing the TX signal component converted to analog form by the DAC 2230 with the quadrature component of the TX path LO signal. The output of the second TX path mixer may be added to the output of the first TX path mixer to create a real RF signal. A second input of each of the TX path mixers may be coupled the LO 2206.

Optionally, the RF device 2200 may include the TX path post-mix filter 2224, configured to filter the output of the TX path mixer 2226.

The TX path amplifier 2222 may include an array of power amplifiers.

In various embodiments, any of the RX path pre-mix filter 2214, the RX path post-mix filter 2218, the TX post-mix filter 2224, and the TX pre-mix filter 2228 may be implemented as RF filters. In some embodiments, an RF filter may be implemented as a plurality of RF filters, or a filter bank. A filter bank may include a plurality of RF filters that may be coupled to a switch, e. g., the RF switch 2234, configured to selectively switch any one of the plurality of RF filters on and off (e.g., activate any one of the plurality of RF filters), in order to achieve desired filtering characteristics of the filter bank (i.e., in order to program the filter bank). For example, such a filter bank may be used to switch between different RF frequency ranges when the RF device 2200 is, or is included in, a BS or in a UE device. In another example, such a filter bank may be programmable to suppress TX leakage on the different duplex distances.

The impedance tuner 2232 may include any suitable circuitry, configured to match the input and output impedances of the different RF circuitries to minimize signal losses in the RF device 2200. For example, the impedance tuner 2232 may include an antenna impedance tuner. Being able to tune the impedance of the antenna 2202 may be particularly advantageous because antenna's impedance is a function of the environment that the RF device 2200 is in, e.g., antenna's impedance changes depending on, e.g., if the antenna is held in a hand, placed on a car roof, etc.

As described above, the RF switch 2234 may be a device configured to route high-frequency signals through transmission paths, e.g., in order to selectively switch between a plurality of instances of any one of the components shown in FIG. 10, e.g., to achieve desired behavior and characteristics of the RF device 2200. For example, in some embodiments, an RF switch may be used to switch between different antennas 2202. In other embodiments, an RF switch may be used to switch between a plurality of RF filters (e.g., by selectively switching RF filters on and off) of the RF device 2200. Typically, an RF system would include a plurality of such RF switches.

The RF device 2200 provides a simplified version and, in further embodiments, other components not specifically shown in FIG. 10 may be included. For example, the RX path of the RF device 2200 may include a current-to-voltage amplifier between the RX path mixer 2216 and the ADC 2220, which may be configured to amplify and convert the downconverted signals to voltage signals. In another example, the RX path of the RF device 2200 may include a balun transformer for generating balanced signals. In yet another example, the RF device 2200 may further include a clock generator, which may, e.g., include a suitable phased-lock loop (PLL), configured to receive a reference clock signal and use it to generate a different clock signal that may then be used for timing the operation of the ADC 2220, the DAC 2230, and/or that may also be used by the LO 2206 to generate the local oscillator signals to be used in the RX path or the TX path.

Variations and Implementations

While embodiments of the present disclosure were described above with references to exemplary implementations as shown in FIGS. 1-9, a person skilled in the art will realize that the various teachings described above are applicable to a large variety of other implementations. For example, descriptions provided herein are applicable not only to 5G systems, which provide one example of wireless communication systems, but also to other wireless communication systems such as, but not limited to, Wi-Fi technology or Bluetooth technology. In yet another example, descriptions provided herein are applicable not only to wireless communication systems, but also to any other systems where antenna arrays may be used, such as radar systems.

In certain contexts, the features discussed herein can be applicable to automotive systems, medical systems, scientific instrumentation, wireless and wired communications, radio, radar, and digital-processing-based systems.

In the discussions of the embodiments above, components of a system, such as phase shifters, frequency mixers, transistors, resistors, capacitors, amplifiers, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to extending the scan range of phased array antennas as described herein.

In one example embodiment, any number of electrical circuits of the present drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors (DSPs), microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present drawings may be implemented as stand-alone modules (e.g., a device with associated components and circuitry configured to perform a specific application or function) or implemented as plug-in modules into application specific hardware of electronic devices. Note that particular embodiments of the present disclosure may be readily included in a SOC package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components shown in the systems of FIGS. 1-9) have only been offered for purposes of example and teaching only. Such information may be varied considerably without departing from the spirit of the present disclosure. It should be appreciated that the system can be consolidated in any suitable manner. Along similar design alternatives, any of the illustrated circuits, components, modules, and elements of the present drawings may be combined in various possible configurations, all of which are clearly within the broad scope of this specification. In the foregoing description, example embodiments have been described with reference to particular component arrangements. Various modifications and changes may be made to such embodiments without departing from the scope of the present disclosure. The description and drawings are, accordingly, to be regarded in an illustrative rather than in a restrictive sense.

Select Examples

Example 1 provides an antenna assembly that includes a package substrate (e.g., 114) having a first face (e.g., 502-1) and an opposing second face (e.g., 502-2); a first antenna element (e.g., 112-1) and a second antenna element (e.g., 112-2) at the first face of the package substrate; a recess (e.g., an air gap 310) in the first face of the package substrate, between the first antenna element and the second antenna element; and a conductive via in the package substrate, the conductive via having a first end at the second face of the package substrate and having a second end abutting the recess. In such an antenna assembly a footprint of the conductive via is within a footprint of the recess, the package substrate includes a first conductive line in a first layer of the package substrate and a second conductive line in a second layer of the package substrate, the first conductive line is between the second face of the package substrate and the second layer of the package substrate, the first conductive line is coupled to a first point (528) of the conductive via and further coupled to a conductive contact at the second face of the package substrate to be coupled to a beamformer die, and the second conductive line is coupled to a second point (532) of the conductive via and further coupled to the first antenna element.

Example 2 provides the antenna assembly according to example 1, where the conductive via includes a first portion, a second portion, and a third portion; the first portion extends between the second face of the package substrate and the first point; the second portion extends between the first point and the second point; and the third portion extends between the second point and the recess.

Example 3 provides the antenna assembly according to example 2, where a length of the third portion is at least 5 times smaller than a length of the second portion, e.g., at least 10 times smaller or at least 15 times smaller.

Example 4 provides the antenna assembly according to examples 2 or 3, where a length of the first portion is at least 5 times smaller than a length of the second portion, e.g., at least 10 times smaller or at least 15 times smaller.

Example 5 provides the antenna assembly according to any one of the preceding examples, where the conductive via is a signal via, the antenna assembly further includes a plurality of ground vias in the package substrate, the ground vias are arranged along a contour that at least partially surrounds the signal via, each of the ground vias has a first end at the second face of the package substrate and a second end at the recess, and footprints of the ground vias are within the footprint of the recess.

Example 6 provides an antenna assembly that includes a package substrate (e.g., 114) having a first face (e.g., 502-1) and a second face (e.g., 502-2), the second face opposing the first face; a first antenna element (e.g., 112-1) and a second antenna element (e.g., 112-2) at the first face of the package substrate; a plurality of conductive contacts (514) at the second face of the package substrate to electrically couple a beamformer (BF) die (e.g., 122) to the second face of the package substrate; a first signal via in the package substrate, the first signal via to electrically couple a first conductive contact of the plurality of conductive contacts and the first antenna element; and a recess (e.g., an air gap 310) in the first face of the package substrate, between the first antenna element and the second antenna element, where a footprint of the first signal via is within a footprint of the recess.

Example 7 provides the antenna assembly according to example 6, where the recess extends further into the package substrate than at least one of the first antenna element and the second antenna element.

Example 8 provides the antenna assembly according to examples 6 or 7, further including one or more first ground vias in the package substrate, the one or more first ground vias being proximate to the first signal via, where a footprint of each of the one or more first ground vias is within the footprint of the recess.

Example 9 provides the antenna assembly according to any one of examples 6-8, where the first signal via extends between the recess and the second face of the package substrate.

Example 10 provides the antenna assembly according to example 9, where the package substrate includes a first conductive line (524) to couple the first conductive contact to a first point (528) of the first signal via, and a second conductive line to couple a second point (532) of the first signal via to the first antenna element.

Example 11 provides the antenna assembly according to example 10, where the first signal via includes a first portion, a second portion, and a third portion; the first portion extends between the second face of the package substrate and the first point; the second portion extends between the first point and the second point; and the third portion extends between the second point and the recess.

Example 12 provides the antenna assembly according to example 11, where a length of the third portion is at least 5 times smaller than a length of the second portion, e.g., at least 10 times smaller or at least 15 times smaller.

Example 13 provides the antenna assembly according to examples 11 or 12, where a length of the first portion is at least 5 times smaller than a length of the second portion, e.g., at least 10 times smaller or at least 15 times smaller.

Example 14 provides the antenna assembly according to any one of examples 10-13, where the first conductive line is in a plane between the second face of the package substrate and a plane of the second conductive line.

Example 15 provides the antenna assembly according to example 14, where the plane of the second conductive line is between the recess and the plane of the first conductive line.

Example 16 provides the antenna assembly according to any one of examples 6-15, further including a second signal via to electrically couple a second conductive contact of the plurality of conductive contacts and the second antenna element; a third antenna element; a third signal via to electrically couple a third conductive contact of the plurality of conductive contacts and the third antenna element; a fourth antenna element; and a fourth signal via to electrically couple a fourth conductive contact of the plurality of conductive contacts and the fourth antenna element.

Example 17 provides the antenna assembly according to example 16, where a footprint of each of the second signal via, the third signal via, and the fourth signal via is within the footprint of the recess.

Example 18 provides the antenna assembly according to examples 16 or 17, where each of the first signal via, the second signal via, the third signal via, and the fourth signal via is closer to the first antenna element and the second antenna element than to the third antenna element and the fourth antenna element.

Example 19 provides the antenna assembly according to any one of examples 16-18, where at least two of the first signal via, the second signal via, the third signal via, and the fourth signal via are between the first antenna element and the second antenna element.

Example 20 provides the antenna assembly according to any one of examples 16-19, where no signal vias are between the third antenna element and the fourth antenna element.

Example 21 provides the antenna assembly according to any one of examples 16-20, where the recess is a trench, the first antenna element and the third antenna element are to a first side of the trench, and the second antenna element and the fourth antenna element are to a second side of the trench.

Example 22 provides the antenna assembly according to example 21, where a width of the trench is between about 10% and 40% of a distance between the first antenna element and the second antenna element.

Example 23 provides the antenna assembly according to examples 21 or 22, where a depth of the trench is between about 50% and 100% of a thickness of the antenna assembly.

Example 24 provides the antenna assembly according to any one of the preceding examples, where the package substrate is a PCB.

Example 25 provides the antenna assembly according to any one of the preceding examples, where each of the first antenna element and the second antenna element is a stacked patch antenna.

Example 26 provides the antenna assembly according to any one of the preceding examples, where the first antenna element and the second antenna element are surface mount (SMT) components.

Example 27 provides an antenna assembly that includes a package substrate (e.g., 114) having a first face (e.g., 502-1) and a second face (e.g., 502-2), the second face opposing the first face; a first surface mount (SMT) component (912-1), including a first antenna element (e.g., 112-1), the first SMT component coupled to the first face of the package substrate; a second SMT component (912-2), including a second antenna element (e.g., 112-2), the second SMT component coupled to the first face of the package substrate; and a conductive via in the package substrate, the conductive via having a first end at the second face of the package substrate and having a second end abutting an opening (910) between the first SMT component and the second SMT component. In such an antenna assembly a footprint of the conductive via is within a footprint of the opening (910) between the first SMT component and the second SMT component, the package substrate includes a first conductive line in a first layer of the package substrate and a second conductive line in a second layer of the package substrate, the first conductive line is between the second face of the package substrate and the second layer of the package substrate, the first conductive line is coupled to a first point (528) of the conductive via and further coupled to a conductive contact at the second face of the package substrate to be coupled to a beamformer die, and the second conductive line is coupled to a second point (532) of the conductive via and further coupled to the first antenna element by being coupled to a port (938) of the first SMT component.

Example 28 provides the antenna assembly according to example 27, where the first SMT component has a side dimension between about 0.2 and 0.4 of a free space wavelength of radiation that the first antenna element is to send or receive.

Example 29 provides the antenna assembly according to examples 27 or 28, where the first SMT component has a height between about 0.03 and 0.25 of a free space wavelength of radiation that the first antenna element is to send or receive.

Example 30 provides the antenna assembly according to any one of examples 27-29, where a distance between the first SMT component and the second SMT component is between about 0.1 and 0.4 of a free space wavelength of radiation that the first antenna element is to send or receive.

Example 31 provides the antenna assembly according to any one of examples 27-30, where each of the first SMT component and the second SMT component is coupled to the package substrate via a BGA or an LGA.

The invention claimed is:

1. An antenna assembly, comprising:

a printed circuit board (PCB) having a first face and an opposing second face;

a first antenna element and a second antenna element at the first face of the PCB;

a recess in the first face of the PCB, between the first antenna element and the second antenna element; and a conductive via in the PCB, the conductive via having a first end at the second face of the PCB and having a second end abutting the recess, wherein:

a footprint of the conductive via is within a footprint of the recess, the PCB includes a first conductive line in a first layer of the PCB and a second conductive line in a second layer of the PCB, the first conductive line is between the second face of the PCB and the second layer of the PCB, the first conductive line is coupled to a first point of the conductive via and further coupled to a conductive contact at the second face of the PCB to be coupled to a beamformer die, and the second conductive line is coupled to a second point of the conductive via and further coupled to the first antenna element.

2. The antenna assembly according to claim 1, wherein:

the conductive via includes a first portion, a second portion, and a third portion, the first portion extends between the second face of the PCB and the first point, the second portion extends between the first point and the second point, and the third portion extends between the second point and the recess.

3. The antenna assembly according to claim 2, wherein a length of the third portion is at least 5 times smaller than a length of the second portion.

4. The antenna assembly according to claim 2, wherein a length of the first portion is at least 5 times smaller than a length of the second portion.

5. The antenna assembly according to claim 1, wherein:

the conductive via is a signal via, the antenna assembly further includes a plurality of ground vias in the PCB, the ground vias are arranged along a contour that at least partially surrounds the signal via, each of the ground vias has a first end at the second face of the PCB and a second end at the recess, and footprints of the ground vias are within the footprint of the recess.

6. An antenna assembly, comprising:

a printed circuit board (PCB) having a first face and a second face, the second face opposing the first face;

a first antenna element and a second antenna element at the first face of the PCB;

a plurality of conductive contacts at the second face of the PCB to couple a beamformer (BF) die to the second face of the PCB;

a first signal via in the PCB, the first signal via to couple a first conductive contact of the plurality of conductive contacts and the first antenna element;

one or more first ground vias in the PCB, the one or more first ground vias at least partially surrounding the first signal via;

a recess in the first face of the PCB, between the first antenna element and the second antenna element, wherein each of a footprint of the first signal via and a footprint of each of the one or more first ground vias is within a footprint of the recess.

7. The antenna assembly according to claim 6, wherein the recess extends further into the PCB than the first antenna element and the second antenna element.

8. The antenna assembly according to claim 6, wherein the first signal via extends between the recess and the second face of the PCB, and wherein the PCB includes:

a first conductive line to couple the first conductive contact to a first point of the first signal via, and a second conductive line to couple a second point of the first signal via to the first antenna element.

9. The antenna assembly according to claim 6, further comprising:

a second signal via to couple a second conductive contact of the plurality of conductive contacts and the second antenna element;

a third antenna element;

a third signal via to couple a third conductive contact of the plurality of conductive contacts and the third antenna element;

a fourth antenna element; and a fourth signal via to couple a fourth conductive contact of the plurality of conductive contacts and the fourth antenna element, wherein a footprint of each of the second signal via, the third signal via, and the fourth signal via is within the footprint of the recess.

10. The antenna assembly according to claim 9, wherein each of the first signal via, the second signal via, the third signal via, and the fourth signal via is closer to the first antenna element and the second antenna element than to the third antenna element and the fourth antenna element.

11. The antenna assembly according to claim 9, wherein at least two of the first signal via, the second signal via, the third signal via, and the fourth signal via are between the first antenna element and the second antenna element.

12. The antenna assembly according to claim 9, wherein no signal vias are between the third antenna element and the fourth antenna element.

13. The antenna assembly according to claim 9, wherein:

the recess is a trench, the first antenna element and the third antenna element are to a first side of the trench, and the second antenna element and the fourth antenna element are to a second side of the trench.

14. The antenna assembly according to claim 13, wherein:

a width of the trench is between about 10% and 40% of a distance between the first antenna element and the second antenna element, and a depth of the trench is between about 50% and 100% of a thickness of the antenna assembly.

15. The antenna assembly according to claim 6, wherein each of the first antenna element and the second antenna element is a stacked patch antenna.

16. The antenna assembly according to claim 6, wherein the first antenna element and the second antenna element are surface mount (SMT) components.

17. The antenna assembly according to claim 6, wherein:

a first surface mount (SMT) component comprises the first antenna element; and a second SMT component comprises the second antenna element.

18. The antenna assembly according to claim 17, wherein the first SMT component has a side dimension between about 0.2 and 0.4 of a free space wavelength of radiation that the first antenna element is to send or receive, and a height between about 0.03 and 0.25 of the free space wavelength.

19. The antenna assembly according to claim 17, wherein a distance between the first SMT component and the second SMT component is between about 0.1 and 0.4 of a free space wavelength of radiation that the first antenna element is to send or receive.

20. The antenna assembly according to claim 17, wherein each of the first SMT component and the second SMT component is coupled to the PCB via a ball grid array (BGA) or a land grid array (LGA).

* * * * *